US007685111B2

(12) United States Patent
Muroi et al.

(10) Patent No.: US 7,685,111 B2
(45) Date of Patent: Mar. 23, 2010

(54) INFORMATION MANAGEMENT DEVICE, INFORMATION MANAGEMENT SYSTEM, AND COMPUTER USABLE MEDIUM

(75) Inventors: Kazushige Muroi, Nagoya (JP); Satoru Yanagi, Nagoya (JP); Kazuma Aoki, Kasugai (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 312 days.

(21) Appl. No.: 11/529,284

(22) Filed: Sep. 29, 2006

(65) Prior Publication Data

US 2007/0100816 A1 May 3, 2007

(30) Foreign Application Priority Data

Sep. 30, 2005 (JP) .......................... P2005-288538

(51) Int. Cl.
*G06F 7/00* (2006.01)
(52) U.S. Cl. .......................... 707/3; 707/1; 707/104.1; 707/100
(58) Field of Classification Search ............... 707/104.1, 707/10, 100, 7, 1, 3
See application file for complete search history.

(56) References Cited

U.S. PATENT DOCUMENTS

| 5,083,860 | A  | * | 1/1992  | Miyatake et al. ............ 352/129 |
| 6,166,314 | A  | * | 12/2000 | Weinstock et al. ........... 84/483.1 |
| 6,430,563 | B1 | * | 8/2002  | Fritz et al. ..................... 707/10 |
| 6,449,226 | B1 | * | 9/2002  | Kumagai ..................... 369/47.1 |
| 6,591,261 | B1 | * | 7/2003  | Arthurs ........................... 707/2 |
| 6,640,225 | B1 | * | 10/2003 | Takishita et al. ................ 707/5 |
| 6,654,735 | B1 | * | 11/2003 | Eichstaedt et al. ............. 707/3 |
| 6,741,987 | B2 | * | 5/2004  | Ito .................................. 707/6 |
| 2002/0060955 | A1 | * | 5/2002  | Kumagai .................. 369/30.05 |
| 2002/0078061 | A1 | * | 6/2002  | Wong et al. .................. 707/101 |
| 2002/0184212 | A1 | * | 12/2002 | Ugai et al. ....................... 707/6 |
| 2003/0050915 | A1 | * | 3/2003  | Allemang et al. .............. 707/1 |
| 2003/0154480 | A1 | * | 8/2003  | Goldthwaite et al. .......... 725/46 |
| 2003/0200192 | A1 | * | 10/2003 | Bell et al. ....................... 707/1 |
| 2004/0015497 | A1 | * | 1/2004  | Swarna et al. .................. 707/6 |
| 2004/0172409 | A1 | * | 9/2004  | James ..................... 707/104.1 |

(Continued)

FOREIGN PATENT DOCUMENTS

JP        8-255165        10/1996

(Continued)

OTHER PUBLICATIONS

Japanese Office Action, with Partial English Translation, issued in Japanese Patent Application No. JP 2005-288538, dated May 27, 2008.

*Primary Examiner*—Hosain T Alam
*Assistant Examiner*—Leon Harper
(74) *Attorney, Agent, or Firm*—McDermott Will & Emery LLP

(57) ABSTRACT

One identification information piece to identify one data correlated with another data can be output as being correlated with the another data. In addition, when the one data is displayed or printed on the basis of the output one identification information piece or when another data associated with the one data is searched out, a score is given to the correlation of the one data with the another data and the one data correlated with the another data is preferentially output in accordance with the score.

4 Claims, 24 Drawing Sheets

U.S. PATENT DOCUMENTS

| | | | |
|---|---|---|---|
| 2004/0193590 A1* | 9/2004 | Mizunuma et al. | 707/3 |
| 2004/0225571 A1* | 11/2004 | Urali | 705/26 |
| 2005/0209820 A1* | 9/2005 | Inoue et al. | 702/183 |
| 2005/0262428 A1* | 11/2005 | Little et al. | 715/501.1 |
| 2006/0004724 A1* | 1/2006 | Tabata et al. | 707/3 |

FOREIGN PATENT DOCUMENTS

| | | |
|---|---|---|
| JP | 2000-315203 A | 11/2000 |
| JP | 2004-32085 A | 1/2004 |
| JP | 2005-198231 | 7/2005 |

* cited by examiner

FIG. 2

| ID | START TIME | END TIME | STATUS ID | DESTINATION ADDRESS | TARGET DOCUMENT ADDRESS | AMOUNT |
|---|---|---|---|---|---|---|
| sid1 | 20xx/xx/xx xx:xx:xx | 20xx/xx/xx xx:xx:xx | PRN | | file://**//** | 1 |
| sid2 | 20xx/xx/xx xx:xx:xx | 20xx/xx/xx xx:xx:xx | FXT | 05x-xxx-xxxx | file://**//** | |
| sid3 | 20xx/xx/xx xx:xx:xx | 20xx/xx/xx xx:xx:xx | PRN | | http://**//** | 2 |
| sid4 | 20xx/xx/xx xx:xx:xx | 20xx/xx/xx xx:xx:xx | BKX | 4-xxxx-xxxx-x | http://**//** | 30 |

FIG. 3

| STATUS | STATUS ID | GID | DESTINATION ADDRESS | TARGET DOCUMENT ADDRESS | AMOUNT |
|---|---|---|---|---|---|
| PC PRINT | PRN | 1 | NONE | ADDRESS OF PRINTED DOCUMENT | NUMBER OF COPIES |
| PC FAX TRANSMISSION | FPT | 2 | DESTINATION FAX NUMBER | ADDRESS OF TRANSMITTED DOCUMENT | NONE |
| PC FAX RECEPTION | FPR | 2 | SOURCE FAX NUMBER | ADDRESS OF RECEIVED DOCUMENT | NONE |
| SCAN-TO-PC | SCN | 0 | NONE | ADDRESS OF SCANNED IMAGE | NONE |
| SCAN-TO-MEDIA | SCM | 0 | NONE | ADDRESS OF SCANNED IMAGE | NONE |
| SCAN-TO-MAIL | SML | 2 | DESTINATION MAIL ADDRESS | ADDRESS OF TRANSMITTED IMAGE (COPIED TO PC) | NONE |
| FAX TRANSMISSION | FXT | 2 | FAX NUMBER OF DESTINATION | ADDRESS OF TRANSMITTED IMAGE (COPIED TO PC) | NONE |
| FAX RECEPTION | FXR | 2 | SOURCE FAX NUMBER | ADDRESS OF RECEIVED IMAGE (COPIED TO PC) | NONE |
| COPY | CPY | 0 | NONE | ADDRESS OF COPIED IMAGE (COPIED TO PC) | NUMBER OF COPIES |
| EMISSION OF TELEPHONE CALL | TLT | 2 | DESTINATION TELEPHONE NUMBER | ADDRESS OF COMMUNICATION SOUND (COPIED TO PC) | COMMUNICATION TIME |
| RECEPTION OF TELEPHONE CALL | TLR | 2 | TELEPHONE NUMBER OF SOURCE | ADDRESS OF COMMUNICATION SOUND (COPIED TO PC) | COMMUNICATION TIME |
| MEDIA PRINT | PRM | 0 | NONE | ADDRESS OF PRINTED IMAGE (COPIED TO PC) | NUMBER OF COPIES |
| BOOK | BKX | 2 | ISBN | ADDRESS OF BOOK INTRODUCING HP (SEARCHED) | TIME (MINUTE) |

FIG. 4

| ID | TIME | DOCUMENT ADDRESS | EVENT | APPLICATION | OPERATOR |
|---|---|---|---|---|---|
| did1 | 20xx/xx/xx xx:xx:xx | file://**/**/d1 | create | MULTIFUNCTION MACHINE A | user2 |
| did2 | 20xx/xx/xx xx:xx:xx | file://**/**/d2 | open | EDITOR | user1 |
| did3 | 20xx/xx/xx xx:xx:xx | file://**/**/d2 | update | EDITOR | user1 |
| did4 | 20xx/xx/xx xx:xx:xx | file://**/**/d1 | open | VIEWER | user1 |
| did5 | 20xx/xx/xx xx:xx:xx | file://**/**/d1 | close | VIEWER | user1 |
| did6 | 20xx/xx/xx xx:xx:xx | file://**/**/d3 | open | MAILER | user1 |
| did7 | 20xx/xx/xx xx:xx:xx | file://**/**/d3 | send | MAILER | user1 |
| did8 | 20xx/xx/xx xx:xx:xx | file://**/**/d2 | close | EDITOR | user1 |

FIG. 5

| ID | REGISTRATION TIME | PAPER FILE ID | DOCUMENT ADDRESS |
|---|---|---|---|
| pid1 | 20xx/xx/xx xx:xx:xx | xxx1 | file://###/###/### |
| pid2 | 20xx/xx/xx xx:xx:xx | xxx2 | file://###/###/### |
| pid3 | 20xx/xx/xx xx:xx:xx | xxx1 | file://###/###/### |

FIG. 6

| DEVICE TYPE | DEVICE ID |
|---|---|
| MULTIFUNCTION MACHINE | MULTIFUNCTION MACHINE ID1 |
| BOOK SENSOR | BOOK SENSOR ID2 |
| PAPER FILE READER | PAPER FILE READER ID3 |

FIG. 10A

THIS DOCUMENT IS PREVIOUSLY PRINTED IN 200x/xx/xx xx:xx:xx
CHECK # ****  FILE

FIG. 10B

THIS DOCUMENT IS PREVIOUSLY PRINTED IN 200x/xx/xx xx:xx:xx

FIG. 10C

THIS DOCUMENT IS PREVIOUSLY TRANSMITTED TO OO IN
200x/xx/xx xx:xx:xx

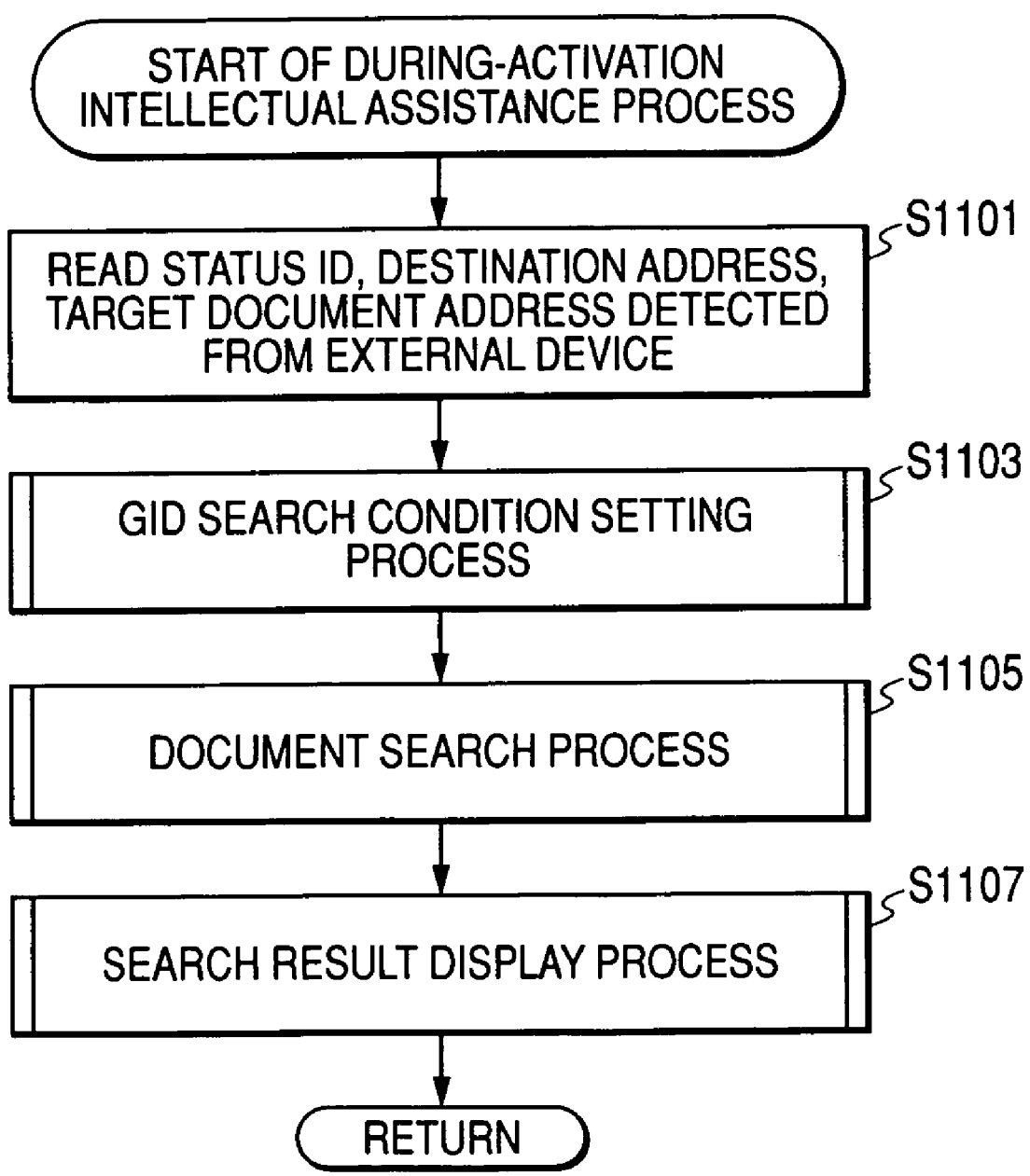

FIG. 14

| ID | DOCUMENT ADDRESS 1 | DOCUMENT ADDRESS 2 | CORRELATION SCORE |
|---|---|---|---|
| rid1 | file://＊＊＊/＊＊＊/＊＊＊ | file://＊＊＊/＊＊＊/d1 | 100 |
| rid2 | file://＊＊＊/＊＊＊/d1 | http://＊＊＊/＊＊＊/＊＊＊ | 90 |
| rid3 | http://＊＊＊/＊＊＊/＊＊＊ | file://＊＊＊/＊＊＊/d3 | 80 |
| rid4 | file://＊＊＊/＊＊＊/d2 | file://＊＊＊/＊＊＊/＊＊＊ | 70 |

FIG. 16

THIS [DOCUMENT] WAS [PRINT]ED PREVIOUSLY

| ADDRESS | TIME | REFERENCE NUMBER |
|---|---|---|
| · file://###/###/### | x/x xx:xx:xx | x |
| · file://###/###/### | x/x xx:xx:xx | x |
| · file://###/###/### | x/x xx:xx:xx | x |

FIG. 17

THE FOLLOWING DOCUMENTS ARE OPENED WHEN PRINTING THIS [DOCUMENT] WAS PREVIOUSLY [PRINT]ED

| ADDRESS | TIME | REFERENCE NUMBER |
|---|---|---|
| · file://###/###/### | x/x xx:xx:xx | x |
| · file://###/###/### | x/x xx:xx:xx | x |
| · file://###/###/### | x/x xx:xx:xx | x |

FIG. 18

[TELEPHONE COMMUNICATION] WITH THIS [PERSON] WAS PERFORMED PREVIOUSLY

| ADDRESS | TIME | REFERENCE NUMBER |
|---|---|---|
| · file://###/###/### | x/x xx:xx:xx | x |
| · file://###/###/### | x/x xx:xx:xx | x |
| · file://###/###/### | x/x xx:xx:xx | x |

FIG. 19

THE FOLLOWING DOCUMENTS WERE OPENED WHEN [TELEPHONE COMMUNICATION] WITH THIS [PERSON] WAS PREVIOUSLY PERFORMED

| ADDRESS | TIME | REFERENCE NUMBER |
|---|---|---|
| · file://###/###/### | x/x xx:xx:xx | x |
| · file://###/###/### | x/x xx:xx:xx | x |
| · file://###/###/### | x/x xx:xx:xx | x |

INFORMATION MANAGEMENT DEVICE, INFORMATION MANAGEMENT SYSTEM, AND COMPUTER USABLE MEDIUM

CROSS REFERENCE TO RELATED APPLICATION

This application claims priority from Japanese Patent Application No. 2005-288538 filed Sep. 30, 2005, the contents of which are hereby incorporated by reference into the present application.

TECHNICAL FIELD

Aspects of the present invention relate to an information management device, which can manage a plurality of data as a management target, an information management system, and a program associated with the information management device.

BACKGROUND

In recent years, personal computers (hereinafter, referred to as "PC") have been widely spread and used for a personal purpose or on business. For example, a PC is connected to an external device serving as an information input source or an external device for performing an operation based on a command from the PC in a communication-practicable manner. Specifically, the PC is supplied with a large amount of data from the external devices and the information is used and managed by the PC, while the processes based on the managed information are performed to the external devices. In the environment in which it is difficult to install a plurality of external devices corresponding to the processes, a so-called multifunction machine having a plurality of means for executing a plurality of functions is connected to the PC.

The PC and the external devices transmit and receive a large amount of information therebetween in association with operations of the external devices, and the large amount of information is managed by the PC (for example, see JP-A-2004-32085).

In the PC for managing a large amount of data, there have been suggested techniques of correlating data with each other so as to enhance the efficiency of works using the data to be managed.

For example, there is known an information management system which can perform the correlating operation by allowing a message requesting for an instruction of correlating conditions to be displayed and allowing a user to give an instruction in response to the display so as to correlate one data to be written or one data previously written with another data and which can display the another data correlated with the one data at the time of utilizing the one data (for example, see JP-A-2000-315203).

SUMMARY

Aspects of the present invention provide an information management device which can manage data so that one data having a high degree of correlation with another data can be distinguished from the other data at the time of providing the one data correlated with the another data to a user, an information management system including the information management device, and a program for executing a predetermined operation to the information management device.

BRIEF DESCRIPTION OF THE DRAWINGS

FIG. 2 is a diagram illustrating a status table according to an illustrative aspect of the invention;

FIG. 3 is a diagram illustrating definitions of items stored in the status table according to a first illustrative aspect of the invention;

FIG. 4 is a diagram illustrating a document table according to an illustrative aspect of the invention;

FIG. 5 is a diagram illustrating a file information table according to an illustrative aspect of the invention;

FIG. 6 is a diagram illustrating a device designating table according to an illustrative aspect of the invention;

FIGS. 10A, 10B, and 10C are diagrams illustrating a display format resulting from the before-activation intellectual assistance process according to the invention;

FIG. 11 is a diagram illustrating a flow of a during-activation intellectual assistance process according to the first illustrative aspect of the invention;

FIG. 14 is a diagram illustrating a correlation table according to an illustrative aspect of the invention;

FIG. 16 is a diagram illustrating a display format (associated with the status table) of a search result in the during-activation intellectual assistance process according to an illustrative aspect of the invention;

FIG. 17 is a diagram illustrating a display format (associated with the document table) of a search result in the during-activation intellectual assistance process according to an illustrative aspect of the invention;

FIG. 18 is a diagram illustrating a display format (associated with the status table) of a search result in the during-activation intellectual assistance process according to an illustrative aspect of the invention;

FIG. 19 is a diagram illustrating a display format (associated with the document table) of a search result in the during-activation intellectual assistance process according to an illustrative aspect of the invention;

DETAILED DESCRIPTION

General Overview

Figure 1:
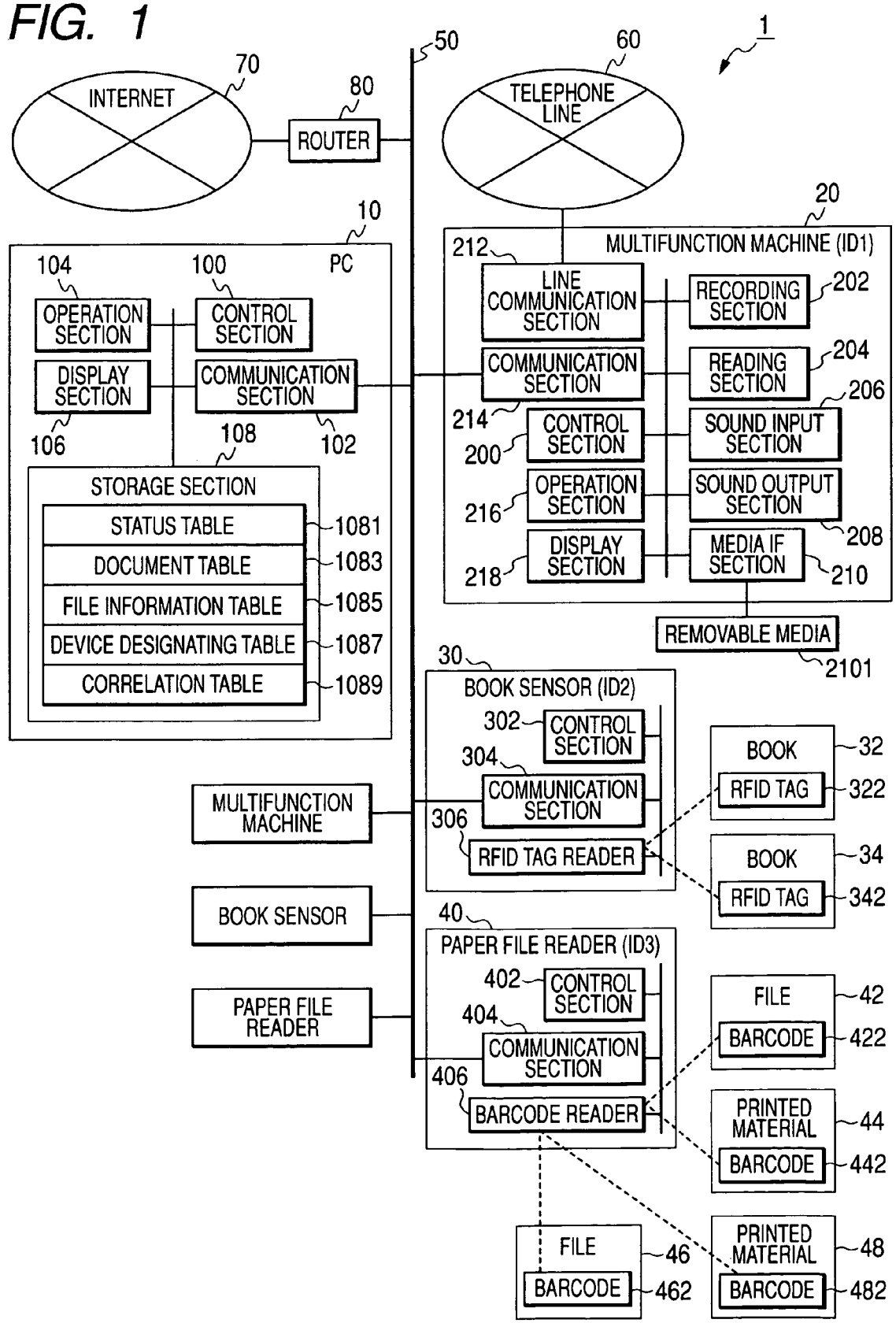
FIG. 1 is a diagram illustrating a configuration of an information management system according to an illustrative aspect of the present invention.

According to an aspect of the invention, it is possible to provide an information management device which can classify and manage data correlated with each other in accordance with a degree of correlation.

According to another aspect of the invention, it is possible to provide an information management system which can classify and manage data correlated with each other in accordance with a degree of correlation on the basis of a process performed by an external device.

According to still another aspect of the present invention, an information management device which can output one identification information piece, which is associated with one data correlated with another data, as being correlated with the another data and which can give a score to the correlation of the one data with the another data and preferentially output the one data correlated with the another data in accordance with the score when the one data is utilized on the basis of the one identification information piece or when another data associated with the one data is searched out.

According to still another aspect of the invention, there is provided an information management device comprising: a data storage unit that stores a plurality of data; a utilization unit that utilizes the data; a period specifying unit that specifies a period in which the data are utilized by the utilization unit; a correlation giving unit that correlates one data and another data with each other when one period specified by the period specifying unit for the one data stored in the storage unit and another period specified by the period specifying unit for the another data stored in the storage unit overlaps with each other; a search unit that searches out the another data correlated with the one data by the correlation giving unit by using one identification information piece to identify the one data as a first search condition; an output unit that outputs another identification information piece to identify the another data extracted by the search unit as being correlated with the one data; a detection unit to detect that the another data is utilized by the utilization unit or that the another data is replaced with the one data and then another data is searched out by the search unit, on the basis of the another identification information output by the output unit; a score giving unit that gives a score to the correlation of the another data output by the output unit with the one data correlated with the another data on condition that it is detected by the detection unit that another data is utilized by the utilization unit or is searched out by the search unit; an accumulation unit that accumulates the score given by the score giving unit with the correlation of the one data with the another data; a score storage unit that stores the score accumulated by the accumulation unit; and an output control unit that controls to output the another data, to the correlation of which with the one data the score is given, in the order of the score stored in the score storage unit.

Accordingly, when a user utilizes one data considered as being correlated with another data while being aware of the another data, a score is given to the correlation of both data on the basis of a behavior of the user and is accumulated. As a result, when one identification information piece to identify the one data correlated with the another data is output, it is possible to provide the one data to the user in accordance with the accumulated score, that is, the degree of correlation with the another data.

When another data associated with one data considered as being correlated with still another data is searched out, a score is given to the correlation of both data and accumulated on the basis of a behavior of a user who searches out the one data while being aware of the another data. As a result, when outputting one identification information piece to identify the one data correlated with the another data, it is possible to provide the one data to the user in accordance with the accumulated score, that is, the degree of correlation with the another data.

The "information management device" is a concept including a structure in which one or more means constituting the information management device constitute one device and a plurality of devices can be connected to each other in a communication-practicable manner, in addition to a structure having physically one device.

The "period" includes factors of time points.

The "identification information" may be "a file name", "a thumbnail", and other information to identify data, or may be data itself.

The "score" may be a point expressed by a "numeral" or may be information for distinguishing one data from another data which is not utilized by the utilization unit or is simply output by the output unit without being searched out by the search unit.

According to still another aspect of the invention, there is provided an information management system comprising: the information management device; and an external device which is connected to the information management device in a communication-practicable manner and has at least one function performing unit that performs a predetermined process, wherein the external device comprises a transmission unit that transmits process specifying information, which is used to specify a process performed by the function performing unit and a period in which the process is performed, and data, which is obtained by performing the process, to the information management device, wherein the information management device comprises: a reception unit that receives the process specifying information and the data transmitted from the external device; and a storage control unit that correlates and stores the process specifying information and the data received by the reception unit in the data storage unit, wherein the period specifying unit specifies the period which is included in the process specifying information and in which the process is performed, wherein the correlation giving unit correlates the one data with the another data by using the period correlated with the process specifying information specified by the period specifying unit as the one period and using the data correlated with the process specifying information as the one data, and wherein the search unit can search the data storage unit for the data having been subjected to the same process by using the process, which is performed by the function performing unit and included in the process specifying information, as a second search condition and can search out the another data by using the data searched out on the basis of the second search condition.

Accordingly, when a specific process (function) is performed by an external device, the data having been utilized by the information management device in a period in which the process was performed can be correlated with the data as a process target of the external device.

According to still another aspect of the invention, there is provided a computer usable medium having computer readable instructions stored thereon for enabling a computer to perform predetermined operations including the steps of: storing a plurality of data in a storage unit; utilizing the data; specifying a period in which the data are utilized; correlating one data and another data with each other when one period specified by the specifying for the one data stored in the storage unit and another period specified by the specifying for the another data stored in the storage unit overlaps with each other; searching out the another data correlated with the one data by using one identification information piece to identify the one data as a first search condition; outputting another identification information piece to identify the another data extracted by the searching as being correlated with the one data; detecting that the another data is utilized or that the another data is replaced with the one data and then another data is searched out by the searching, on the basis of the another identification information output by the outputting; giving a score to the correlation of the another data output by the outputting with the one data correlated with the another data on condition that it is detected that another data is utilized or is searched out; accumulating the score thus given; storing the score thus accumulated; and controlling to output the another data, to the correlation of which with the one data the score is given, in the order of the score stored in the score storage unit.

Accordingly, it is possible to provide a user with one data having a high degree of correlation with another data in a state where the one data can be distinguished from the another data.

FIRST EXAMPLE

Hereinafter, a specific information management system according to an illustrative aspect of the invention will be described with reference to the drawings. The invention is not limited to the configuration described below, but may employ a variety of configurations within the same technical spirit.

(Configuration of Information Management System)

FIG. 1 is a diagram illustrating an information management system. As can be seen from the figure, the information management system 1 comprises a PC 10 as an information processing device comprising an information management function, a multifunction machine 20 as an external device for performing a variety of functions, a book sensor 30 as an external device for sensing books 32 and 34 as a management target of the PC 10, and a paper file reading section 40 as an external device for sensing paper files 42 and 46, which are stationery for filing paper as a management target of the PC 10, and printed materials 44 and 48. The devices are all connected to each other through a network line 50.

The PC 10 comprises a CPU, a ROM, and a RAM (not shown), and further comprises a control section 100 for controlling operations of the PC 10 (the entire PC 10) on the basis of programs stored in the ROM, a communication section 102, which is connected to the network line 50 so as to control the network line 50, an operation section 104 for receiving instructions from a user of the PC 10, a display section 106 for displaying a variety of information, and a storage section 108 comprising a hard disk or the like.

The storage unit 108 includes a status table 1081, a document table 1083, a file information table 1085, a device designation table 1087, and a correlation table 1089. Details of the tables will be described later.

The multifunction machine 20 comprises a CPU, a ROM, and a RAM (not shown), and further comprises a control section 200 for controlling operations of the multifunction machine 20 (the entire multifunction machine 20), a recording section 202 as an image forming unit, a reading section 204 as an image reading unit, a sound input section 206 as a microphone, a sound output section 208 as a speaker, and a media IF section 210 fitted with a removable media 2101. The multifunction machine further comprises a line communication section, which is connected to a telephone line 60 so as to control the telephone line 60, a communication section 214, which is connected to the network line 50 so as to control the network line 50, an operation section 216 for receiving instructions from a user of the multifunction machine 20, and a display section 218 for displaying a variety of information.

A device ID (multifunction machine ID 1) indicating that it is a device constituting the information management system 1 is given to the multifunction machine 20.

The book sensor 30 comprises a CPU, a ROM, and a RAM (not shown), and further comprises a control section 302 for controlling operations of the book sensor 30 (the entire book sensor 30), a communication section 304, which is connected to the network line 50 so as to control the network line 50, and a radio-frequency (RF) ID tag reading section 306 for reading information of RFID tags 322 and 324 given to books 32 and 34.

The book sensor 30 serves as a device for storing information indicating what book is in a user's hands at what times (is being read or is ready to be read). That is, when the RFID tag read 306 is activated on the basis of the program stored in the ROM of the control section 302 and a response is read from the RFID tag 332 or 342 of the books 32 and 34, the identification information on the RFID tag 332 or 342 and the present time (start time) are temporarily stored in the RAM of the control section 302. Then, when the response read from the RFID tags 332 or 342 ends, the identification information on the RFID tag 332 or 342 and the start time temporarily stored in the RAM of the control section 302 and the present time (end time) are transmitted to the PC 10 through the communication section 304. The PC 10 stores the information in the statue table 1081.

A device ID (book sensor ID 2) indicating that it is a device constituting the information management system 1 is given to the book sensor 30.

The paper file reading section 40 comprises a CPU, a ROM, and a RAM (not shown), and further comprises a control section 402 for controlling operations of the paper file reading section 40 (the entire paper file reading section 40), a communication section 404 connected to the network line 50 so as to control the network line 50, and a barcode reading section 406 for reading barcodes 422, 442, 462, and 482 given to the paper files 42 and 46 or the printed materials 44 and 48. The paper file reading section 40 serves as an input section for forming information, which is used to correspond the paper files 42 and 46 with the printed materials 44 and 48 filed in the paper files, in a file information table 1085. That is, the paper file reading section inputs the barcodes of the paper files through the barcode reading section 406 on the basis of a program stored in a ROM of the control section 402, and then inputs the barcodes of the printed materials, in which the barcodes are temporarily stored in a RAM of the control section 402. The input data temporarily stored are transmitted to the PC 10 through the communication section 404. The PC 10 receives the information and adds the received information to the status table 1081 and the file information table 1085.

A device ID (paper file reading section ID 3) indicating that it is a device constituting the information management system 1 is given to the paper file reading section 40.

Now, information stored in the status table 1081, the document table 1083, the file information table 1085, and the device designation table 1087 included in the storage unit 108 of the PC 10 will be described (the correlation table 1089 will be described later).

As shown in FIG. 2, the status table 1081 stores a processing operation (status ID) executed by an execution unit of the multifunction machine 20, start and end times of the processing operation (wherein it can be properly determined what time is set as the start time or the end time), information (hereinafter, referred to as "target document address") indicating a location of a document which is a target of the processing operation (hereinafter, referred to as "target document"), a destination address for specifying a specific counter party when the processing operation is performed to the specific counter party, and an amount of the target document which is a target of the processing operation, as one record every time when the processing operation is performed. A unique ID to identify the processing operation is given to each processing operation.

The status ID stored in the status table 1081 is defined as shown in FIG. 3. For example, when the PC 10 performs a print job using the recording section 202 of the multifunction machine 20 (this case is defined as a status "PC print" in FIG. 3), the status ID is set to "PRN", the destination address is set to "None", the target document address is set to "Address of printed document", and the amount is set to "Number of copies."

Since the PC print operation is performed between the PC 10 and the multifunction machine 20, the destination address is set to "None." Since the document as a target of the processing operation is stored in the storage section 108 of the PC 10, an address of the storage section 108 storing the target document or an address of a homepage (hereinafter, referred to as "HP") when the target document is a specific HP is stored as the target document address. The amount is set to the "Number of sheets." For example, when a sheet of target document is printed, the amount is "one copy."

When a facsimile (hereinafter, referred to as "fax") transmission is performed using the reading section 204 and the line communication section 212 of the multifunction machine 20 (this case is defined as a status "fax transmission" in FIG. 3), the status ID is set to "FAX", the destination address is set to "Destination FAX number", the target document address is set to "Address of transmitted image (copied to PC)", and the amount is set to "None."

Since the fax transmission is performed between the multifunction machine 20 and a different facsimile machine, the destination address is set to "Destination FAX number." In the information management system 1, when the fax transmission is performed, the transmitted image as a target of the fax transmission is stored in the storage section 108 of the PC 10. Accordingly, an address in the storage section 108 in which the transmitted image is stored (an address of the transmitted image (copied to the PC)) is defined as the "Target document address" (in the process (status) defined as "(copied to the PC)" in the target document address in FIG. 3, an address in the storage section 108 in which an image or sound is stored as a processing target as described above is defined as the target document address.).

When the books 32 and 34 managed by the PC 10 are used (this case is defined as a status "Book" in FIG. 3), the status ID is set to "BKX", the destination address is set to "Japanese book code (hereinafter, referred to "ISBN")", the target document address is "Book introducing HP address (searched)", and the amount is set to "time (minute)."

ISBN used as the destination address serves to identify the books 32 and 34 and is stored in RFID tags 322 and 342. The address of the HP introducing the books 32 and 34 is provided for a general purpose and is defined as the address stored as the target document address. The amount is set to the time (minute) for using the books 32 and 34.

In addition to those described above, "PC fax transmission (the pc transmits image data and destination to the multifunction machine 20 through the communication section 102 and the multifunction machine 20 fax transmits received image data through the line communication section 212)", "PC fax reception (the line communication section 212 of the multifunction machine 20 transmits the received image data to the PC 10 through the communication section 214 and the PC 10 stores the received image data", "Scan-to-PC (the multifunction machine 20 transmits the image data scanned by the reading section 204 to the PC 10 through the communication section 214 and the PC stores the received image data)", "Scan-to-media (the image data scanned by the reading section 204 are stored in the removable media 2101 through a media interface (hereinafter, referred to as "media IF") section 210)", "Scan-to-mail (the image data scanned by the reading section 204 are transmitted through the communication section 214) ", "Fax transmission (the image data read by the reading section 204 are transmitted through the line communication section 212)", "Fax reception (the image data received by the line communication section 212 are printed by the recording section 202) ", "Copy (the image data read by the reading section 204 are printed by the recording section 202) ", "Telephone transmission", "Telephone reception", and "Media print" (the image data or the document data stored in the removable media 2101 are printed by the recording section 202) are defined respectively.

The paper file ID used as the destination address serves to identify the paper files 42 and 46 or the printed materials 44 and 48 and are given as barcodes to the paper files 42 and 46 or the printed materials 44 and 48. The address stored as the target document address is set to an address in the storage section 108 storing the document data constituting the documents or printed materials 44 and 48 filed in the paper files 42 and 46.

"GID (Group ID)" defined in FIG. 3 is an individual ID given to respective groups into which the respective processing operations (statuses) are divided. Specifically, GID "2" is given to the processing operation of which the destination address is stored, but "0" and "1" are given to the processing operations of which the destination address is set to "None." GID "1" is given to a processing operation (only "PC print" in the illustrative aspect) using target document data previously stored in the storage section 108, and GID "0" is given to a processing operation of which target document data are stored by performing the processing operation.

The document table 1083 stores a work or instruction performed to a document. Here, as shown in FIG. 4, an ID is given to a time when the work or the like is performed (wherein it can be properly determined what time the work or the like is performed), information indicating a location of the document, a work or the like (event) performed to the document, a device performing the work or the like (operating application), and a user carrying out the work.

Data treated in the document table 1083 comprise the document data, image data, and sound data.

Here, as a work (event) performed to a document, "create", "open", "update", "print", "send", and "close" are defined. More specifically describing the events, when a new document is prepared, for example, when a document is prepared by a manipulation of the operation section 104 of the PC 10, when a document is scanned or copied by the use of the reading section 204 of the multifunction machine 20, the document is received in fax or in PC fax by the use of the line communication section 212, or when a communication sound is stored through telephone transmission or telephone reception using the line communication section 212, "create" is stored as an event in the document table 1083.

When the document data, the image data, or the sound data stored in the storage section 108 of the PC are opened by the use of the operation section 104 and when an HP is opened by the use of the operation section 104, "open" is stored as an event in the document table 1083. When the document data or the like are closed, "close" is stored.

When the document data, the image data, or the sound data previously stored in the storage section 108 are updated by an editor stored in the PC 10, "update" is stored as an event in the document table 1083.

When the document data or the image data previously stored in the storage section 108 are printed by the editor, "print" is stored as an event in the document table 1083.

When the document data, the image data, or the sound data previously stored in the storage section 108 are transmitted by a mail transmitting and receiving application stored in the PC 10, or when the document data or the image data previously stored in the storage section 108 are transmitted through the PC fax transmission or the fax transmission of the multifunction machine 20, "send" is stored as an event in the document table 1083.

In the document table 1083, one of the above-mentioned items is stored as a record every time when a work is performed to a document, like in the status table 1081.

Here, the status table 1081 and the document table 1083 need not be two tables different from each other, but may be one table if only the items constituting the records of the tables can be specified.

As shown in FIG. 5, a unique ID for identifying a record, a time when the record is written, a paper file ID for identifying the paper files 42 and 46, and a document address for specifying the printed materials 44 and 48 filed in the paper files 42 and 46 are stored as a record in the file information table 1085.

The paper file ID serves to identify the paper files 42 and 46 and is written in barcodes 442 and 462. The document address stored as the target document address serves to correlate the paper files 42 and 46 with the printed materials 44 and 48 filed therein and denotes an address of an electronic document resulting in the printed materials 44 and 48. That is, when the electronic document resulting in the printed materials 44 and 48 is stored in the storage section 108 of the PC 10, the address in the storage section 108 storing the electronic document is stored as the document address, or when the electronic document is an HP, the address of the HP is stored as the document address. The information is written to the barcodes 442 and 448 recorded in the printed materials 44 and 46.

When a plurality of multifunction machines 20, the book sensor 30, and the paper file reading section are connected to the network line 50, the device designating table 1087 is a table, which specifies and stores a target of the information management system 1 among the multifunction machines 20 and the like. The device designating table comprises the structure shown in FIG. 6.

(Process 1 of Information Management System)

Next, process (1) of the information management system illustrated as above will be described with reference to the figures.

Figure 7:
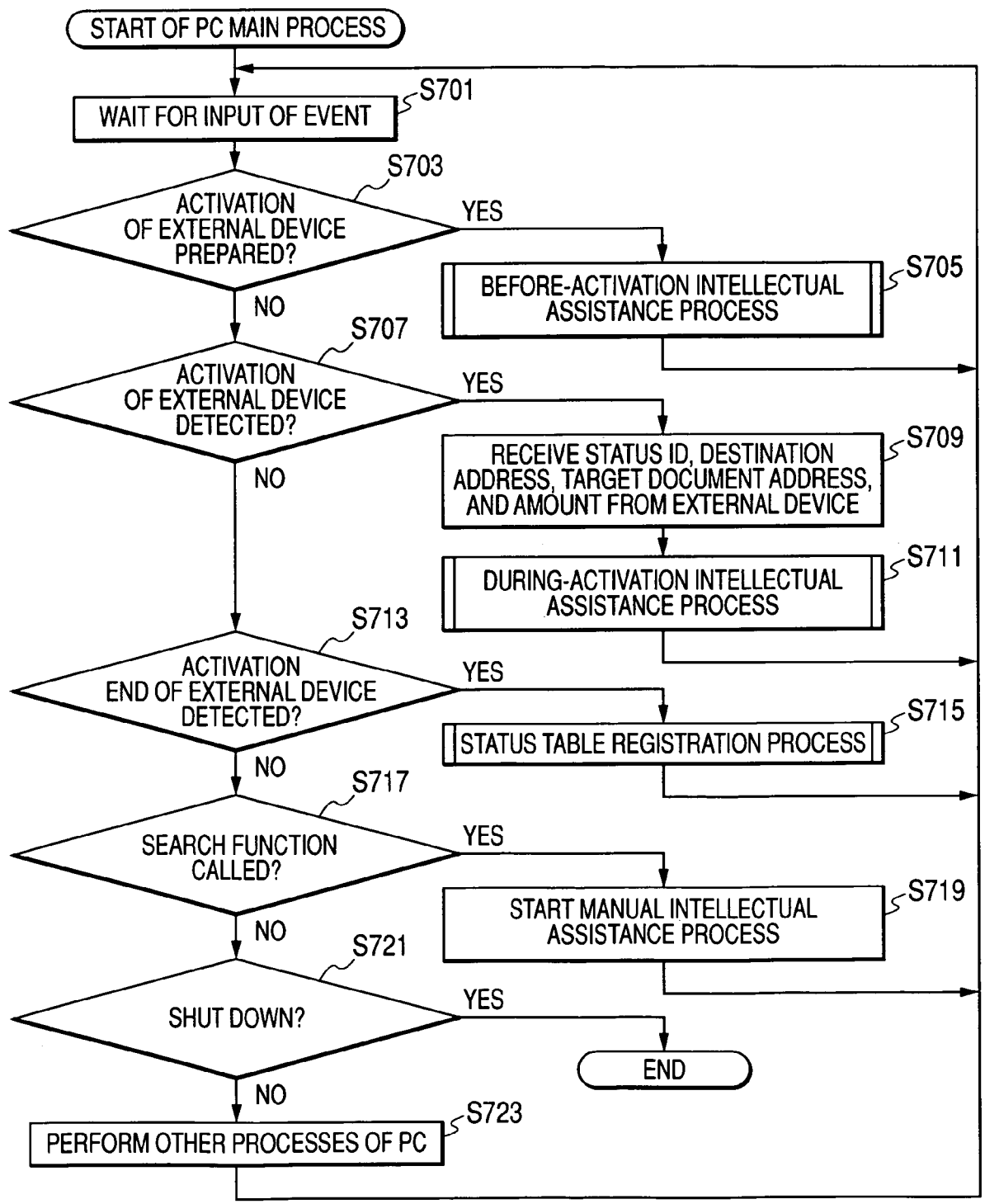
FIG. 7 is a diagram illustrating a flow of a main process performed by a PC according to an illustrative aspect of the invention.

FIG. 7 is a diagram illustrating a flow of a main process performed by the PC 10. The process shown in the flow is performed by the control section 100 of the PC 10, and more specifically, the CPU of the control section 10 performs the process by the use of a program stored in the ROM or the like.

First, the control section 100 waits until an instruction for performing any one process is input through the operation section 104 of the PC 10 or the communication section 102 from a designated external device shown in FIG. 5, such as the multifunction machine 20, the book sensor 30, and the paper file reading section 40 (step 701).

Thereafter, when it is detected in step 701 that an instruction is given, the process is specified. That is, when an instruction is input to the control section 100 first determines whether the instruction is an instruction for activating a printer driver controlling the recording section 202 of the multifunction machine 20 or an instruction for preparing for activation of the external device such as activation of a multifunction machine utility for using the reading section 204 of the multifunction machine 20 (step 703).

When it is determined in step 703 that the input instruction is to prepare for the activation of the external device (step 703: YES), the control section 100 of the PC 10 performs a before-activation intellectual assistance process to be described later and waits until an instruction for performing a process is input (step 701).

The before-activation intellectual assistance process means a process of alarming a user having given the instruction so as to prevent the redundant printing when an instruction for printing the specified document data is given to the recording section 202 of the multifunction machine 20 from the PC 10 but the process of printing the document is previously performed within a predetermined time. The before-activation intellectual assistance process comprises a process of alarming a user having given a fax transmission instruction so as to prevent the redundant fax transmission when the fax transmission instruction for transmitting specific document data to a specific counter party is given to the line communication section 212 of the multifunction machine 20 from the PC 10 but the document data are previously transmitted to the counter party.

On the other hand, when the input instruction is not to prepare for the activation of the external device (step 703: NO), it is determined whether the instruction detected in step 701 is an instruction from one of the multifunction machine 20, the book sensor 30, and the paper file reading section 40 designated in FIG. 5 and an instruction for detecting the activation of the external device (step 707).

When it is determined in step 707 that the instruction is an instruction for detecting the activation of the external device (step 707: YES), the control section 100 receives the information defined in FIG. 3, that is, the status ID, the destination address, the target document address, and the amount, from the external device (step 709). The status ID and the like are stored in the RAM of the control section 100.

Then, the control section performs a during-activation intellectual assistance process (step 711) and then waits until an instruction for performing another process is input when the process is finished (step 701).

The during-activation intellectual assistance process means a process for providing the information used until that time as information associated with a present work when a process corresponding to the same instruction as the instruction from the external device was performed in the past.

When the input instruction is not to prepare for the activation of the external device (step 707: NO), it is determined whether the instruction detected in step 701 is to detect the end of the detected activation of the external device (step 713).

When it is determined in step 707 that the instruction is to detect the end of the activation of the external device (step 713: YES), the control section 100 performs a status-table is registration process to be described later (step 715) and then waits until an instruction for performing another process is input when the status-table registration process is finished (step 701).

When the input instruction is not to end the activation of the external device (step 713: NO), it is determined whether the instruction detected in step 701 is to call a search function (step 717).

When it is determined in step 717 that the input instruction is to call a search function (step 717: YES), the control section performs a manual intellectual assistance process to be described later (step 719) and then waits until an instruction for performing another process is input when the manual intellectual assistance process is finished (step S701).

The manual intellectual assistance process is to provide a user with information associated with a user' present work in response to a condition designated by the user.

When the input instruction is not the manual intellectual assistance process (step 717: NO), it is determined whether the instruction detected in step 701 is to shut down the PC 10 (step 721). When the instruction is to shut down the PC 10 (step 721: YES), the PC 10 is shut off. When the instruction is not to shut down the PC (step 721: NO), a process corresponding to the instruction is performed (step 723). After performing the process, the control section waits until an instruction for performing another process is input (step 701).

(Before-Activation Intellectual Assistance Process)

Figure 8:
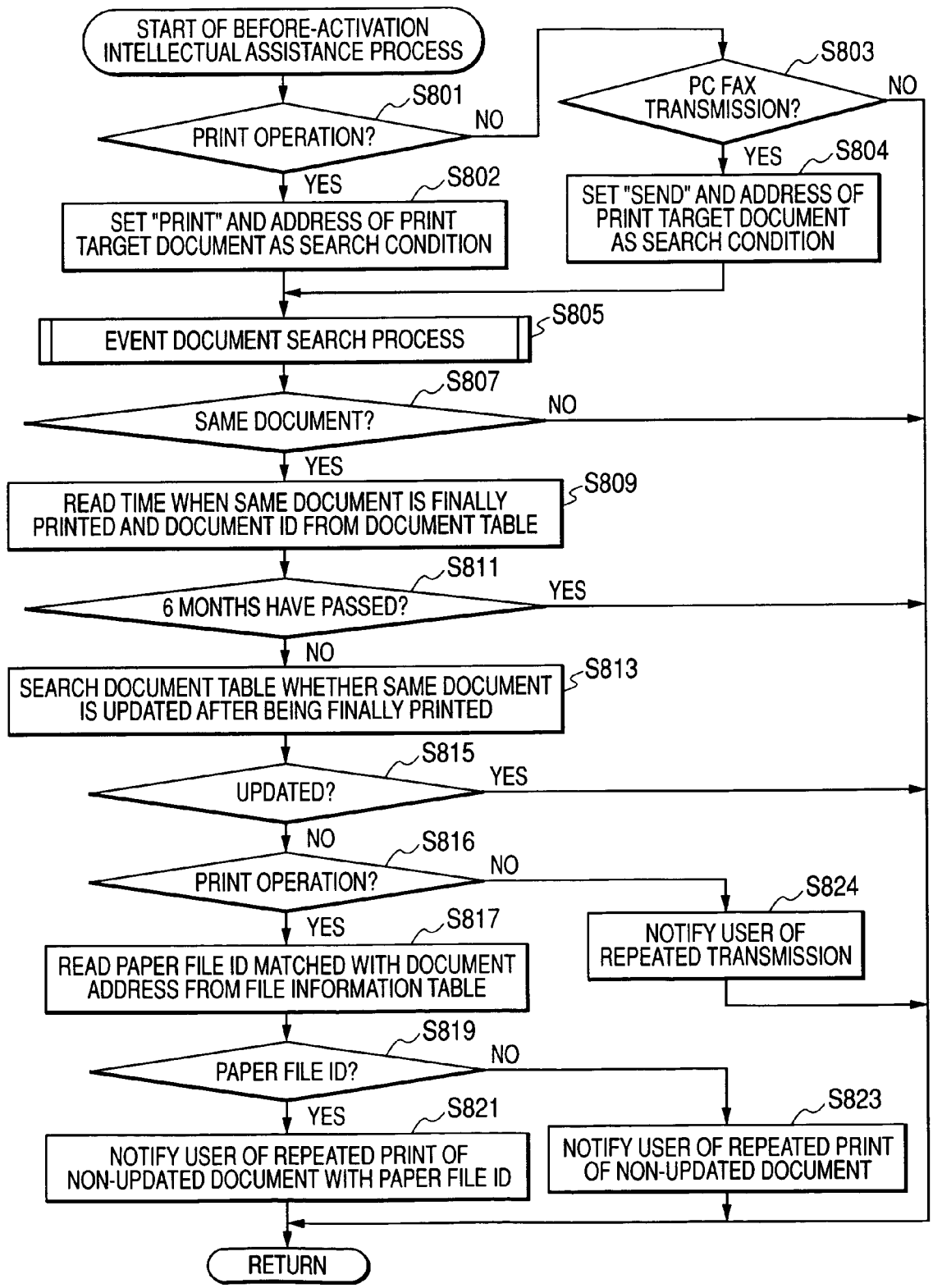
FIG. 8 is a diagram illustrating a flow of a before-activation intellectual assistance process according to an illustrative aspect of the invention.

FIG. 8 is a diagram illustrating a flow of a before-activation intellectual assistance process.

When the before-activation intellectual assistance process is performed in step 705, it is first determined whether the input instruction for preparing for the activation of the external device is a printing instruction to the recording section 202 (step 801). When the input instruction is the printing instruction (step 801: YES), step 802 is performed. On the other hand, when the input instruction is not the printing instruction (step 801: NO), it is determined whether the input instruction for preparing for the activation of the external device is a PC fax transmission instruction to the line transmission section 212 (step 803). When the input illustration is the fax transmission instruction (step 803: YES), the process proceeds to step 804. When the input instruction is not the PC fax transmission instruction (step 803: NO), the control section ends the before-activation intellectual assistance process and waits again in step 701 until an instruction for performing another process is input.

In step 802, in order to confirm whether the same document data as the document data to be printed exist in the previously printed documents, that is, in the documents of which the event is stored as "print" in the document table shown in FIG. 3, the event "print" and the address of the document data to be printed are set as search conditions and an event document search process is performed on the basis of the two search conditions (step 805).

In step 804, in order to confirm whether the same document data as the document data to be transmitted in a PC fax manner and a record of transmission to the same designation exist in the previously transmitted documents, that is, in the documents of which the event is stored as "send" in the document table shown in FIG. 3, the event "send", the destination address (fax number) of the PC fax transmission, and the address of the document data to be transmitted are set as search conditions and the event document search process is performed on the basis of the two search conditions (step 805).

Figure 9:
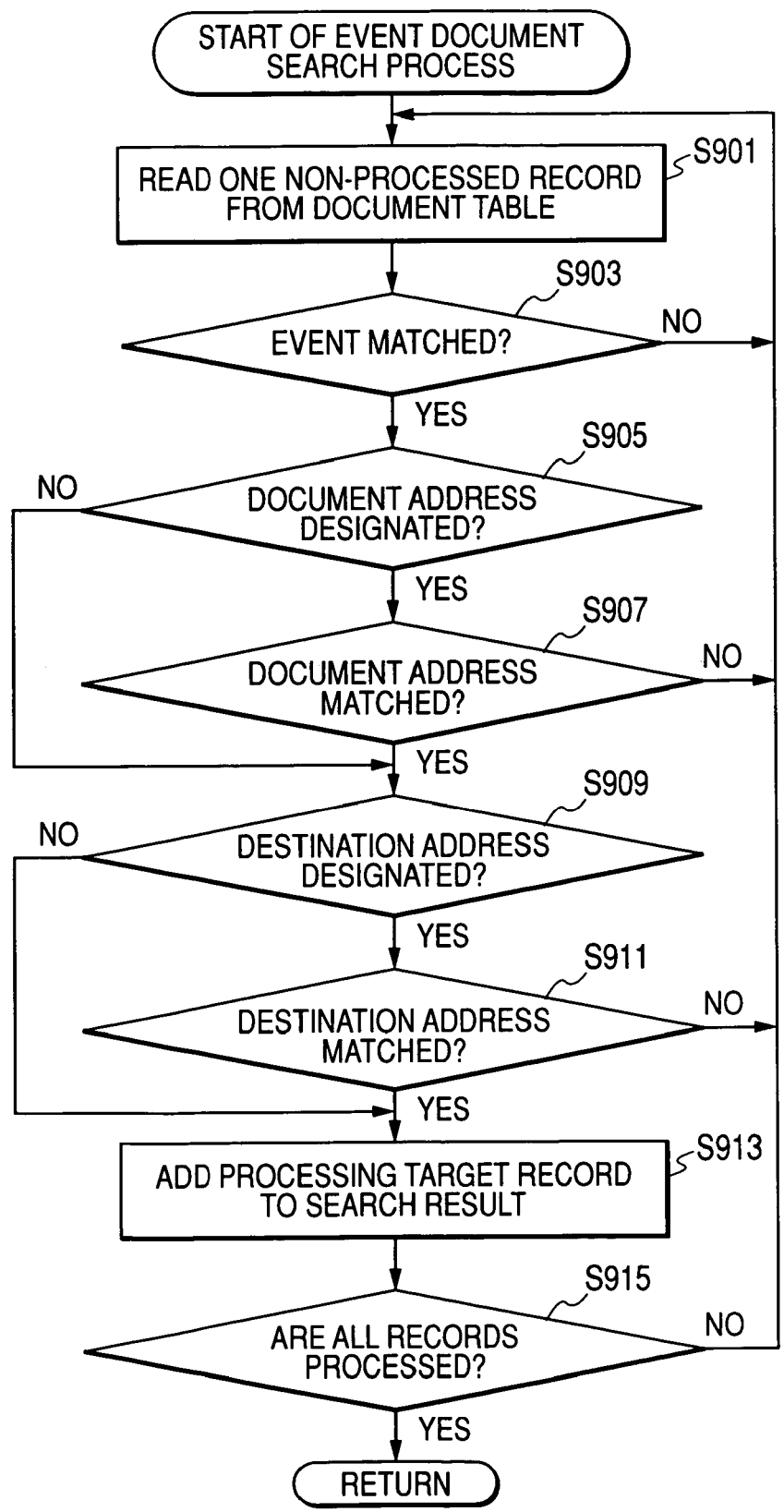
FIG. 9 is a diagram illustrating a flow of an event document search process according to an illustrative aspect of the invention.

FIG. 9 is a diagram illustrating a flow of the event document search process. When the process starts, the control section 100 first reads one record, to which the process is not performed yet, from a document database 1083 (step 901). Then, the control section determines whether an event of the record to be processed is matched with the event "print" ("send") set as the search condition in step 802 (or step 804) (step 903). Here, when the event of the record to be processed is not "print" ("send") (step 903: NO), the record is excluded from the processing target and the process of step 901 is performed again.

On the other hand, when the event of the record to be processed is "print" ("send") (step 903: YES), the control section determines whether the document address is set as the search condition of step 802 (or step 804) (step 905).

When it is determined in step 905 that the document address is set as the search condition of step 802 (or step 804) (step 905: YES), it is determined whether the document address of the record to be processed is matched with the document address designated as the search condition (step 907). When it is determined that the document addresses are matched with each other (step 907: YES), the process of step 909 is performed. When it is determined that the document addresses are not matched with each other (step 907: NO), the process of step 901 is performed again.

When it is determined in step 905 that the document address is not set as the search condition (step 905: NO), the process of step 907 is not performed, but the process of step 909 is performed.

When it is determined in step 909 that the destination address is set as the search condition of step 802 (or step 804) (that is, step 909: YES, when step 804 is performed), it is determined whether the destination address of the record to be processed is matched with the destination address designated as the search condition (step 911). When it is determined that the destination addresses are matched with each other (step 911: YES), the process of step 913 is performed. When it is determined that the destination addresses are not matched with each other (step 911: NO), the process of step 901 is performed.

When it is determined in step 909 that the destination address is not set as the search condition (that is, step 909: NO, when step 802 is performed), the process of step 911 is not performed, but the process of step 913 is performed.

When it is not determined in step 911 whether the destination addresses are matched with each other (step 905: NO or step 907: YES and step 909: NO), or when it is determined in step 911 that the destination addresses are matched with each other (step 905: NO or step 907: YES, step 909: YES, and step 911: YES), it is considered that the document data set as the search condition are previously printed or the document data set as the search condition are previously transmitted to the same designation, and thus the record to be processed is added to the search result (step 913).

Thereafter, it is determined in step 915 whether the event document search process has been performed to all the records of the document table. When the process has not been performed to all the records (step 915: NO), the process of step 901 is performed again. When the process has been performed to all the records (step 915: YES), the event document search process is finished and the process of step 807 is performed.

In step 807, it is determined whether the same document exists through the event document search process of step 805. Here, when it is determined that the same document does not exist (step 807: NO), the document data to be processed are not printed or transmitted to the same designation. Accordingly, the control section does not perform the subsequent processes (that is, performs the print or transmission process), but waits until the next input is performed.

On the contrary, when the same document exists (step 807: YES), the ID and time associated with the latest record (finally printed or transmitted) are read from the records, which determined to be identical (step 809) and it is then determined whether the time passes 6 months from the present time (step 811).

When it is determined that the time passes 6 months (step 811: YES), the document data to be processed are redundantly printed or transmitted to the same designation. However, since a considerable time has passed from the final print or transmission, the control section does not perform the subsequent processes (that is, performs the print or transmission process), but waits again in step 701 until the next input is performed.

On the contrary, when it is determined that the time does not pass 6 months (step 811: NO), it is determined from the document table (see FIG. 3) whether the same document is updated (event "update") after finally printed (event "print") or transmitted (event "send") (step 813).

When it is determined in step 815 that the same document is updated (step 815: YES), the control section performs the print or transmission process and then waits in step 701 until the next input is performed. On the other hand, when it is determined that the same document is not updated (step 815: NO), the type of manipulation is determined. When the manipulation indicates a print process (step 816: YES), the paper file ID corresponding to the document address is read from the file information table 1085 (step 817) so as to determine whether the previously printed document is managed in the file information table 1085 (see FIG. 4) along with the paper file ID thereof.

When it is determined in step 817 that the corresponding paper file ID exists in the file information table 1085, it is notified to the user in the manner shown in FIG. 10A that this print job is to redundantly print the non-updated document with the paper file ID (step 821).

On the other hand, when the corresponding paper file ID does not exist in the file information table 1085, it is notified to the user in the manner shown in FIG. 10B that the non-updated document is redundantly printed (step 823).

When the manipulation indicates a PC fax transmission (step 816: NO), it is notified to the user in the manner shown in FIG. 10C that the same document is transmitted to the same designation (step 824).

(During-Activation Intellectual Assistance Process)

FIG. 11 is a diagram illustrating a flow of a during-activation intellectual assistance process.

In step 711, when the during-activation intellectual assistance process is performed, the control section 100 of the PC 10 first reads the status ID, the destination address, and the target document address input (detected) from the external device in step 709 (step 1101) and performs a GID search condition setting process (step 1103).

Figure 12:
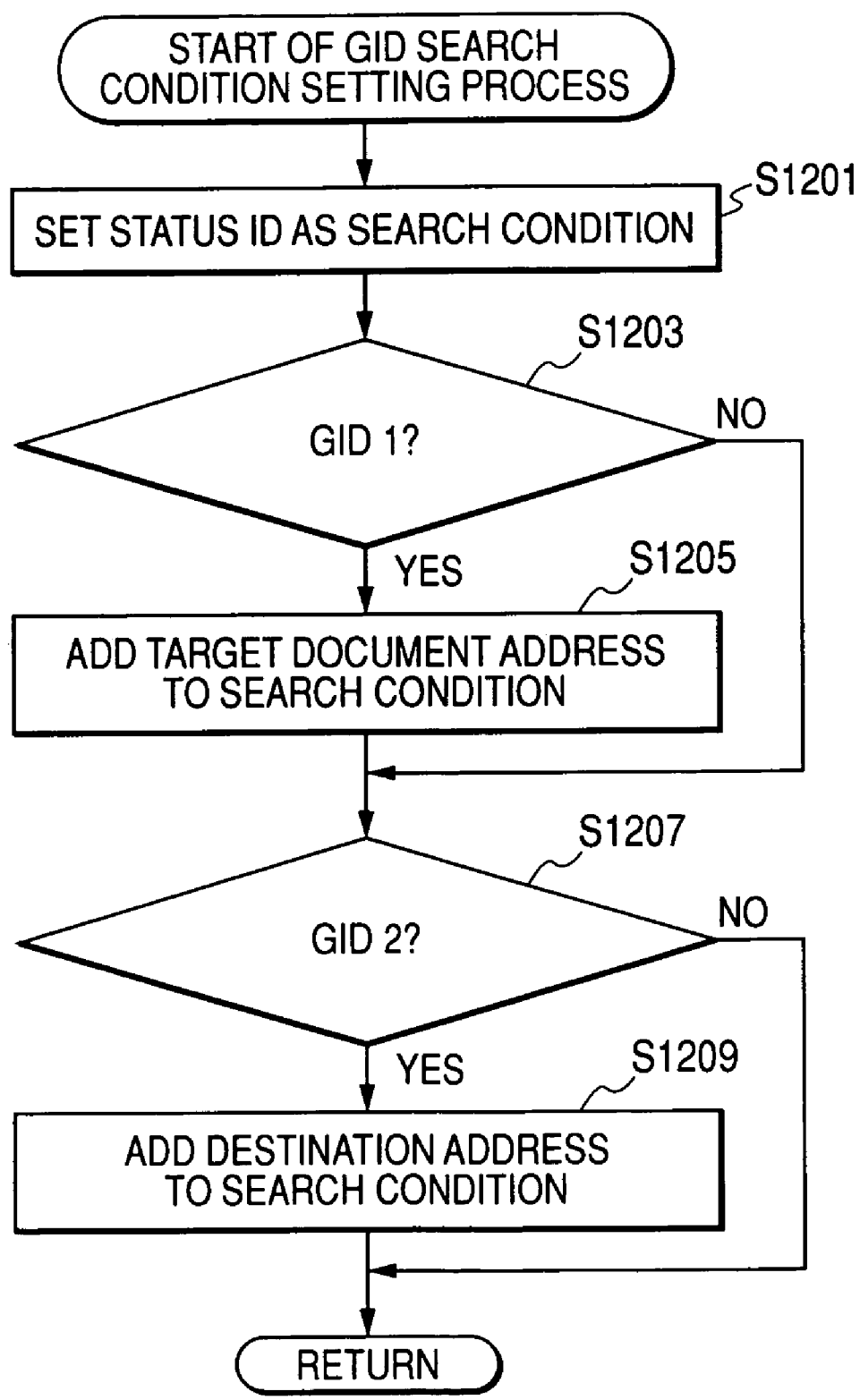
FIG. 12 is a diagram illustrating a flow of a GID search condition setting process according to the first illustrative aspect of the invention.

FIG. 12 is a diagram illustrating a flow of a GID search condition setting process. First, the status ID (see FIGS. 2 and 3) is set as the search condition (step 1201). Next, in order to specify a search condition for performing the search in a so-called "AND condition" with the status ID set in step 1201 when the document search process of step 1105 is performed, the format of a GID is determined to extract a search condition specific to the respective processing operations. That is, it is first determined whether the GID of the status ID set in step 1201 is "1" (see FIG. 3) (step 1203).

When it is determined in step 1203 that the GID is "1" (step 1203: YES), the target document address is added as the search condition (step 1205) and the process of step 1207 is performed. When it is, determined in step 1203 that the GID is not "1", the process of step 1205 is not performed, but the process of step 1207 is performed.

In step 1207, it is determined whether the GID of the status ID set in step 1201 is "2" (see FIG. 3) (step 1207).

When it is determined in step 1207 that the GID is "2" (step 1207: YES), the destination address is added as the search condition (step 1209). The GID search condition setting process is finished and then the document search process (step 1105) is performed using the search conditions specified through the GID search condition setting process.

On the other hand, when it is determined in step 1207 that the GID is not "2", the GID search condition setting process is finished. Then, the document search process (step 1105) is performed using the search conditions specified through the GID search condition setting process.

When "NO" is determined together in steps 1203 and 1207, it is the case in which the GID corresponding to the status ID is "0."

Figure 13:
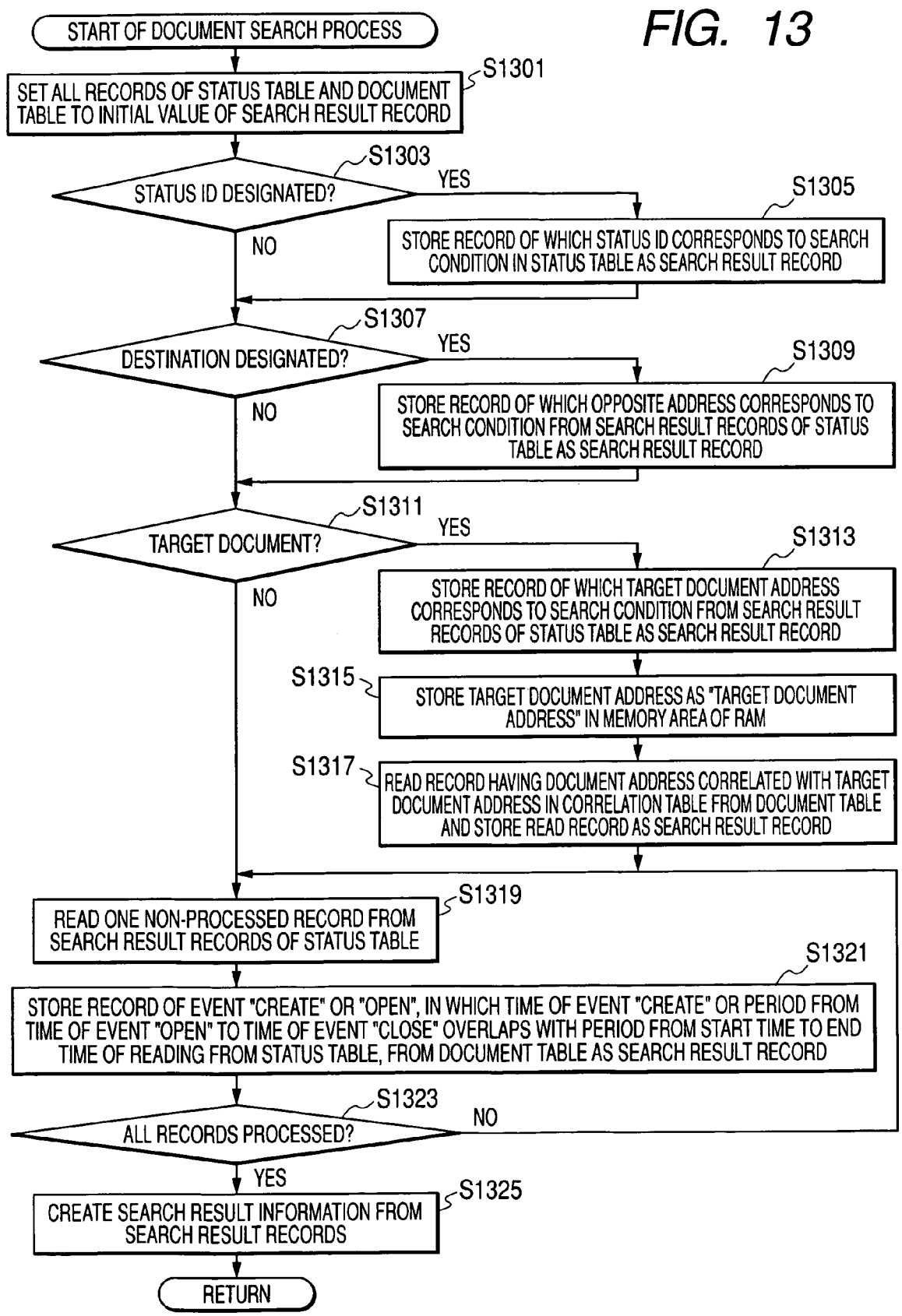
FIG. 13 is a diagram illustrating a flow of a document search process according to an illustrative aspect of the invention.

FIG. 13 is a diagram illustrating a flow of the document search process (step 1105). First, all the records of the status table 1081 and the document table 1083 are set to the initial value of a search result record (step 1301).

Next, in order to specify a target document associated with a specific record from the status table 1081, a search process is performed with the search conditions set in the GID search condition setting process (step 1103) previously performed.

That is, first, it is determined in step 1303 whether the status ID is designated as the search condition (step 1303). In the during-activation intellectual assistance process (step 711), the status ID is generally set as the search condition in step 1201. Accordingly, the determination of step 1303 is "YES", a record corresponding to the status ID set as the search condition from the status table 1081 is stored as a new search result record (step 1305), and then the process of step 1307 is performed.

In step 1307, it is determined whether the destination address is set as the search condition, that is, whether the determination of step 1207 is "YES" and the destination address is added as the search condition in step 1209. When it is determined that the destination address is set (step 1307: YES), a record corresponding to the destination address designated as the search condition from the search result records stored in step 1305 is stored as a new search result record (step 1309), and then the process of step 1311 is performed. When it is determined in step 1307 that the destination address is not set as the search condition (step 1307: NO), the process of step 1309 is not performed, but the process of step 1311 is performed.

It is determined in step 1311 whether the target document address is set as the search condition, that is, whether the determination of step 1203 is "YES" and the target document address is set as the search condition in step 1205. When it is determined that the target document address is set (step 1311: YES), a record corresponding to the target document address designated as the search condition from the search result records stored in step 1305 is stored as a new search result record (step 1313), and then the process of step 1315 is performed.

In step 1315, the target document address set as the search condition is stored in a predetermined area of the RAM of the control section 100 and then the process of step 1317 is performed.

When it is determined in step 1311 that the target document address is not set as the search condition (step 1311: NO), the process of step 1319 is performed without performing the process of step 1313.

In step 1315, the target document address set as the search condition is stored as a target document address in a memory area of the predetermined area of the RAM of the control section 100 (step 1315), and then the process of step 1317 is performed.

In step 1317, records having the same addresses as the target document address set as the search condition and stored as a target document address in step 1315 are specified from the correlation table 1089. An address to which a correlation score is given is extracted from the same addresses as the target document address, a record having the same address as the extracted address is specified from the document table 1083, the specified record is stored as the search result record along with the correlation score stored in the correlation table 1089, and then the process of step 1319 is performed.

As shown in FIG. 14, the correlation table 1089 accumulatively stores the addresses of the document data considered as having a correlation by the document search process performed in the past and stored in the storage unit 108 and the correlation scores given in the document intellectual assistance process performed on the basis of the search result of the document search process performed in the past, more specifically, given in the correlation table updating process performed in the document intellectual assistance process.

In steps 1309 and 1313, a new search result record corresponding to the respective search conditions is stored on the basis of the search result records specified in step 1305. This is because only one GID is set (see FIG. 3) to correspond to each status ID.

In step 1319, in order to perform the processes subsequent to the process of step 1321, one non-processed search result record (substantially one record in the status table 1081) is read from the search result records specified in steps 1303 to 1313 and the process of step 1321 is performed.

In step 1321, in the records stored in the document table 1083 and set to the initial value of the search result record in step 1301, when a period from the time registered in the record having the event "create" or "open" to the time registered in the record having the event "close" and the same document address as the document address of the record having the event "create" (that is, a period when it can be determined that the same document is "opened" or "treated" by the PC 10) overlaps with the period from the start time to the end time of the record read from the status table 1081 in step 1319, the record to be processed in the document table 1083 is stored as the search result record (step 1321).

That is, in the process (step 1321), the status of the external device suitable for the instructed search condition and the documents which it is determined to be opened or utilized at the same period are extracted.

In the information management system 1 according to the first illustrative aspect, when it is intended to utilize again the data having been utilized at that time by using a user's behavior as a key, the document data having been utilized in the same period as the processing operation of the multifunction machine 20 or the like connected to the PC 10 can be considered as being correlated with the processing operation by using the processing operation as the information indirectly indicating the user's behavior. As a result, the document data having been utilized in the same period as the target document (address) as the target of the processing operation can be considered as being correlated with each other. Accordingly, the records having the event "create" or "open" of which the processing times overlap with each other are stored as the search result records.

In human behaviors, a user' behavior may be a "work having been performed a few days ago (for example, PC print work)", in other words, may be to utilize the document (target document) again used at that time by using the user's behavior as a key. In this case, in the information management system 1 according to the first illustrative aspect of the invention, since the document data having utilized in the same period as the processing operation can be considered as being correlated with each other as described above, it is possible to select and utilize a document having a high degree of correlation among a plurality of documents correlated with the target document by using another data having a high frequency of utilization and using the "work having been performed a few days ago" as a key.

When the period from the time registered in the record comprising the event "create" or "open" to the time registered in the record comprising the event "close" and comprising the same document address as the document address of the record comprising the event "create" is determined, the identity of the user (operator in FIG. 4) is considered.

In step 1323, it is determined whether the process of step 1321 is performed to all the records stored as the search result records in the status table 1081. When it is determined that the process is performed to all the records (step 1323: YES), search result information is prepared from the search result record based on the above-mentioned process (step 1325), and then the document search process (step 1105) ends. When it is determined that the process is not performed to all the records (step 1323: NO), the processes repeat from step 1319.

In the information management system 1 according to the illustrative aspect, since the records stored in the status table 1081 are stored as records in the document table at the time of performing the processing operation (see "Document Table Updating Process" to be described later), the records in both tables satisfy the search conditions in step 1321 and are stored as the search result records.

Accordingly, since the search result records stored based on the records stored through the same process is excluded, the start time or the end time of the search result record specified from the status table 1081 is preferably equal to the time of the document table 1083. In addition, even when the condition of step 1321 is satisfied, the search result records in which the target document address and the document address are identical are preferably not stored in step 1321.

When the document search process (step 1105) is finished, the control section 100 performs a process of displaying the search result based on the document search process (step 1105) (step 1107).

In step 1321 of the document search process, the determination using the overlapping of two periods has been performed. However, when the time registered in the record having the event "create", "open", or "close" is included in the period from the start time to the end time of the records in the status table 1081, both periods necessarily overlap with each other. Accordingly, except for the case in which the period from the start time to the end time of the record in the status table 1081 is all included in the period from the time registered in the record having the event "create" or "open" to the time registered in the record having the event "close" and having the same document address as the document address of the record having the event "create" or the like, it is preferable in view of rapid determination to employ this simple determination along with the determination of step 1321.

Similarly, when one of the start time and the end time of the record of the status table 1081 is comprised in the period from the start time of the record comprising the event "create" or "open" to the time registered in the record comprising the event "close" and comprising the same document address as the document address of the record comprising the event "create" or the like, both periods necessarily overlap with each other. Accordingly, as described above, it is preferable in view of rapid determination to employ this simple determination along with the determination of step 1321.

When the time registered in the record comprising the event "create", "open", or "close" overlaps with one of the start time or the end time of the record in the status table 1081, both periods necessarily overlap with each other. Accordingly, as described above, it is preferable in view of rapid determination to employ this simple determination along with the determination of step 1321.

Figure 15:
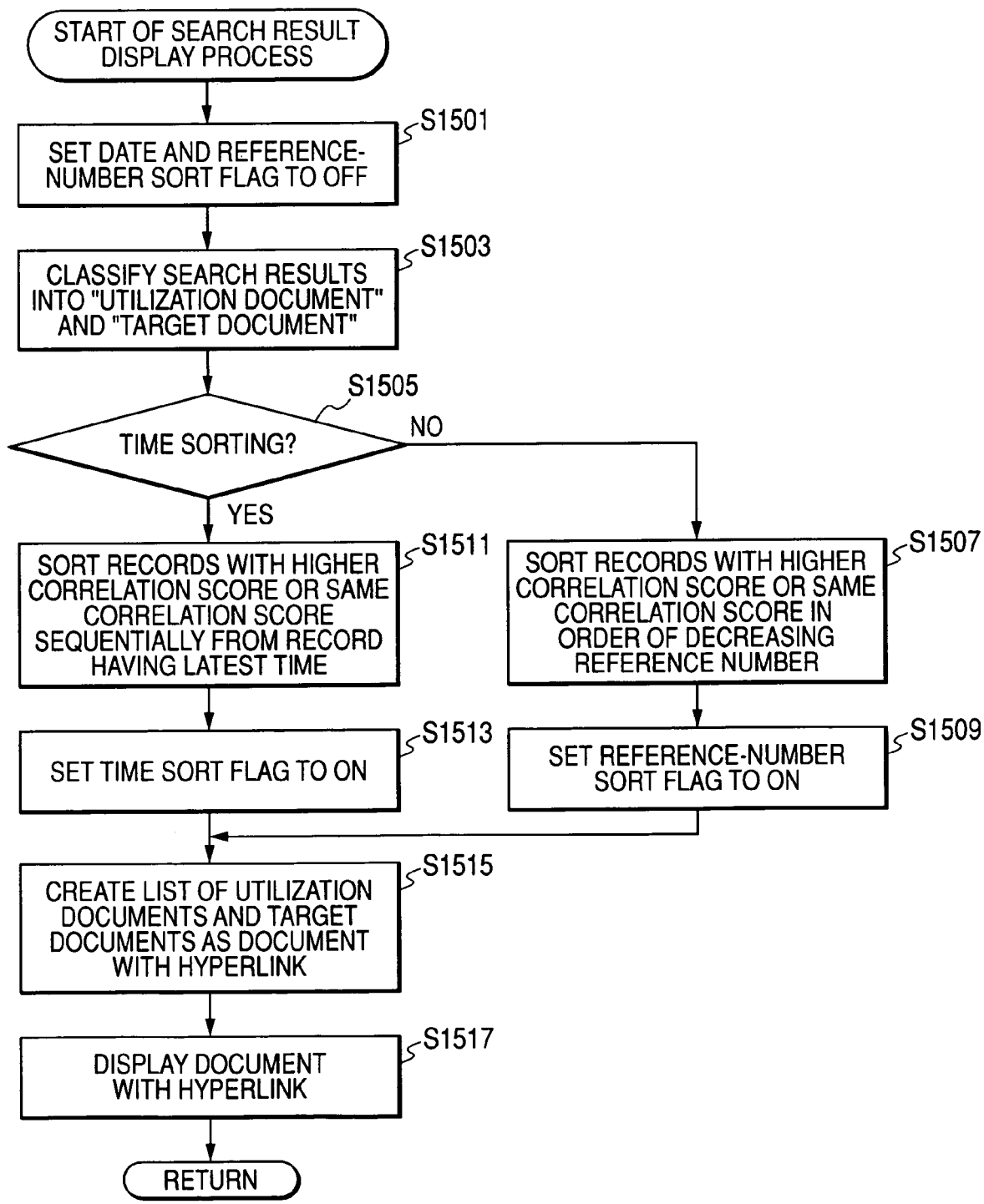
FIG. 15 is a diagram illustrating a flow of the search result display process according to an illustrative aspect of the invention.

FIG. 15 is a diagram illustrating a flow of a search result display process (step 1107). First, at the time of starting the process, the date and the reference sort flag are set to OFF (step 1501).

Next, the search result records specified as the search result information prepared in step 1325 are classified into search result records specified from the status table 1081 (specified through steps 1303 to 1313) and search result records specified from the document table 1083 (specified through steps 1317, 1319 to 1323). The former is a search result associated with a target document and the latter is a search result associated with a utilization document. The search result records are classified into both search results (step 1503).

When the process of step 1503 is finished and then the search result information for classification into the utilization documents and the target documents in step 1503 is displayed, a process of determining in what order the utilization documents and the target documents are displayed is performed.

First, it is determined in step 1505 whether a time sorting method is selected for the display order (step 1505).

When the time sorting method is not selected (step 1505: NO), the search result records classified into the utilization documents and the target documents in step 1503 are sequentially sorted in the order of decreasing the correlation score stored in step 1317 or the records having the same correlation score or the records (target documents) having no correlation score are sorted in the order of decreasing the reference number, and the reference-number sort flag is set to ON (step 1509). Then, the process of step 1515 is performed.

On the other hand, when the time sorting method is selected (step 1505: YES), the control section 100 sequentially sorts the search results comprising the same correlation score in the order of correlation scores set in step 1519 or having no correlation score (target documents) from the search result record comprising the latest time on the basis of both search results classified into the utilization documents and the target documents in step 1503 (step 1511), and then the time sort flag is set to ON (step 1513). Thereafter, the process of step 1515 is performed as described above.

In the information management system according to the illustrative aspect, the search result records can be sorted in the order of correlation scores of the records and the search results comprising the same correlation score can be sorted using two items of time and reference number at the time of displaying the search results. Accordingly, it can be determined as follows in which of the time and the reference number the search results are sorted. That is, by determining whether the search results are sorted in one item, specifically, by determining whether the time sorting method is selected, it can be determined by the use of which of the time and the reference number a user intends to sort the search results (when the search results comprise the same correlation score and the time sorting method is not selected, it is considered that the reference number sorting method is selected).

When the search results are sorted in the order of correlation scores, the time or the reference number, which is used to sort the search results may be selected by the user through the operation section 104, for example, after performing the process of step 1501 and before performing the process of step 1505.

In step 1515, lists of the utilization documents and the target documents are prepared so as to access the documents on the basis of the search result records sorted in accordance with the condition selected in step 1507 or 1511. The lists are displayed in step 1517.

In the information management system 1 according to the first illustrative aspect, when the activation of the external device is detected in step 707, the during-activation intellectual assistance process (step 711) is performed in response to the detection. Accordingly, as for the detected document data as a target of the processing operation or the processing operation itself, the documents which are considered as being opened or utilized in the same period in the past can be notified to the user with the detecting operation. As a result, when a process is necessary for the documents associated with this process, the necessary process can be performed at the same time (in the same period).

For example, in case of fax transmission, it is possible to determine whether the documents opened, at the time of the previous fax transmission should be transmitted by opening the documents.

FIGS. 16 to 19 are diagrams illustrating the process results of the during-activation intellectual assistance process displayed on the display section 106 of the PC 10 by performing step 1517.

Specifically, FIG. 16 shows a search result associated with the target document specified by performing the during-activation intellectual assistance process (step 711) when an instruction of printing documents data stored in the storage section 108 is given to the recording section 202 of the multifunctional machine 20 from the PC 10 (a PC print operation is performed as the processing operation: see FIG. 3).

That is, when the PC print operation is performed, the document search process (step 1105) is performed on the basis of the target document address as a processing target of the PC print operation. As a result, the time when the target document data as a print target of the print operation were printed is displayed in the format shown in FIG. 16. In this case, the addresses and the reference numbers in FIG. 16 are displayed to be identical.

FIG. 17 shows a utilization document opened in the period in which the target document data as the present print target was being printed.

For example, when the PC print operation is indicated by the ID "sid1" in FIG. 2 (the start time of the record is "11:59:00 on Jul. 15, 2005" and the end time is "12:02:00 on Jul. 15, 2005") and the document addresses of the utilization documents associated with the target document of sid1 are "file://*/*/d1", "file://*/*/d2", and "file://*/*/d3" (in FIG. 4, the time of the ID at which the document address of the utilization document is utilized is "11:50:00 on Jul. 15, 2005" for did2, "11:51:00 on Jul. 15, 2005" for did4, "11:53:00 on Jul. 15, 2005" for did5, "12:00:00 on Jul. 15, 2005" for did6, and "12:01:00 on Jul. 15, 2005" for did8), the documents associated with "file://*/*/d2" and "file://*/*/d3" are opened in the period when the PC print operation associated with sid1 was being performed. The records associated with the IDs "did6" and "did8" are extracted and stored as the search result records in step 1321 of the document search process.

On the other hand, "file://*/*/d1" and "file://*/*/d2" are specified from the correlation table 1089 in step 1317 and the records associated with the IDs "did1" to "did5" and "did8" are extracted from the document table 1083.

In the above-mentioned example, the record associated with the ID "did8" of the document table 1083 is extracted through both steps 1317 and 1321. Accordingly, in this case, the PC 10 according to the first illustrative aspect stores the record extracted in step 1317 as the search result record. This is because the record associated with the ID "did8" is extracted along with the correlation score stored in the correlation table 1089 and the correlation score is simultaneously stored as the search result in step 1317.

In this way, the records associated with the IDs "did1" to "did6" and "did8" are extracted from the document table 1083 through the document search process and predetermined items associated with three utilization documents are displayed in the format shown in FIG. 17 through the above-mentioned search result display process.

In performing the display process in step 1517, the correlation score of the correlation with the target document address (data) "file://*/*/*" is not given to "file://*/*/d3" (in other words, the correlation score is "0"), which is displayed at the lower most end. On the other hand, since the correlation score of "100" is given to "file://*/*/d1" and the correlation score of "70" is given to "file://*/*/d2", "file://*/*/d1" is displayed at the uppermost end and "file://*/***/d2" is displayed below it.

FIGS. 18 and 19 show display examples in which the communication results from the emission of a telephone call (event "TLT" in FIG. 3) or the reception of a telephone call (event "TLR" in FIG. 3) through the line communication unit 212 of the multifunction machine 20 in step 707. In case of the emission of a telephone call or the reception of a telephone call, since GID is "2" (see FIG. 3) and the document search process (step 1105) is performed without setting the document address as the search condition, the determination of step 1311 is "NO" and thus the process of step 1317 is not performed. Accordingly, the search result is not sorted in consideration of the "correlation score" in steps 1507 and 1511 of the search result display process (step 1107). The other processes are the same as described above and thus details thereof will be omitted.

In FIG. 16, since the processing operation is a PC print operation, the GID is "1" (see FIG. 3), and the document search process (step 1105) is performed using the document address as the search condition, the addresses and the reference numbers are identical and only the times are different from each other. In case of the telephone transmission or the telephone reception, the GID is "2" (see FIG. 3) and the document search process (step 1105) is performed without using the document address as the search condition. Accordingly, the target document addresses shown in "Address" of FIG. 18 are different from each other.

In the information management system 1 according to the first illustrative aspect, the addresses in FIGS. 16 to 19 are displayed in the hyperlink format (step 1517), and when the hyperlinks are selected using the operation section 104, the document data associated with the address are read from the storage section 108 and are displayed on the display section 106.

(Status Table Registering Process)

Figure 20:
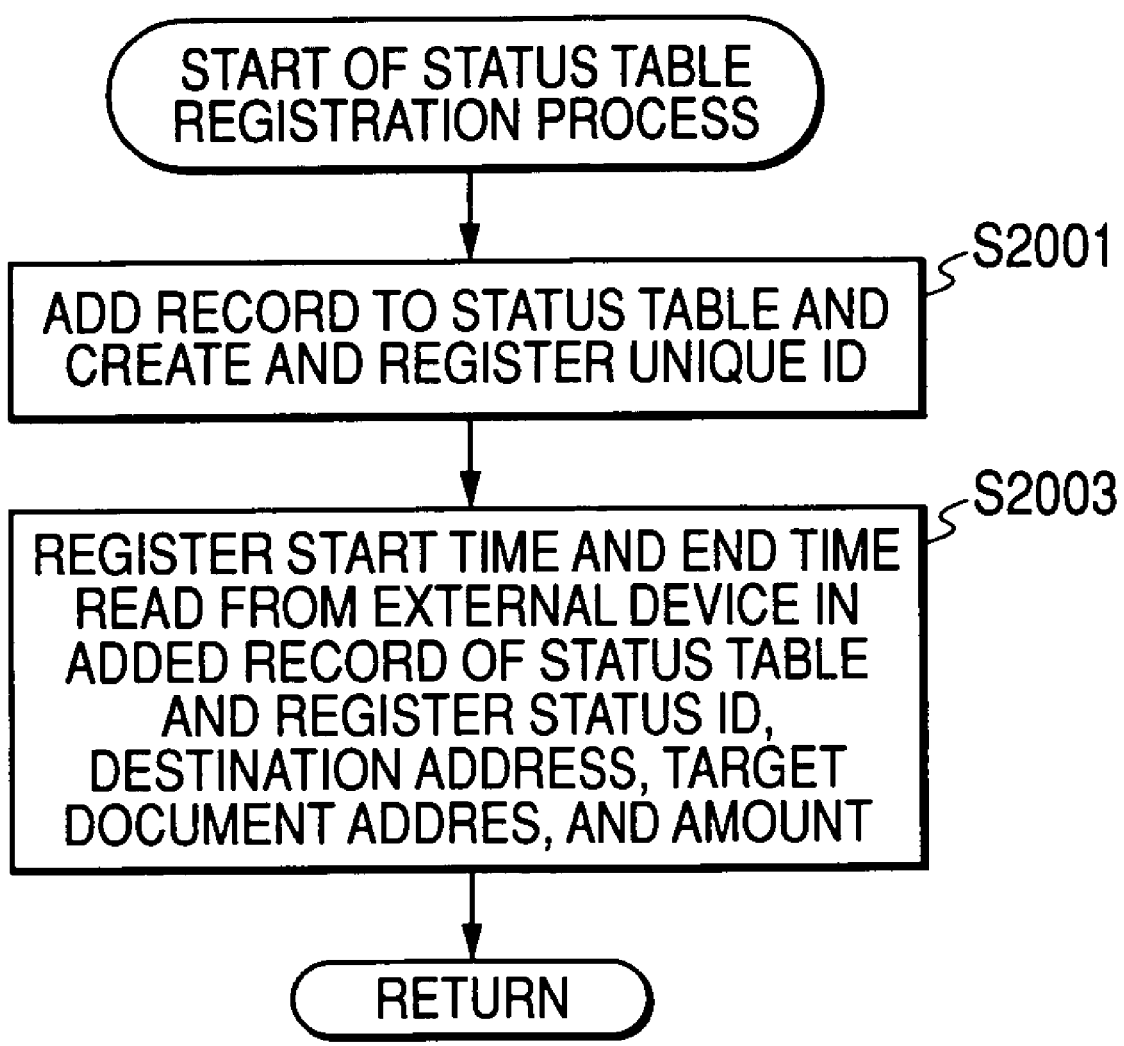
FIG. 20 is a diagram illustrating a flow of a status table registration process according to an illustrative aspect of the invention.

FIG. 20 is a diagram illustrating a flow of a registering process in the status table 1081 shown in FIG. 2.

When the status table registering process is performed in step 715, the control section 100 of the PC 10 additionally creates a unique ID of a record to be registered in the status table 1081. Then, the control section registers the unique ID as an ID of the new record (step 2001) and then performs the process of step 2003.

In step 2003, the time when the activation of the external device is detected in step 707 and the time when the activation end of the external device of which the activation has been detected in step 707 is detected in step 713 are registered as the start time and the end time of the new record in step 2001, respectively, and the status ID, the destination address, the target document address, and the amount, which are input from the external device of which the activation has been detected and stored in the RAM or the like of the control section 100 in step 709 before the during-activation intellectual assistance process (step 711), are similarly registered in the new record in step 2001.

(Manual Intellectual Assistance Process)

Figure 21:
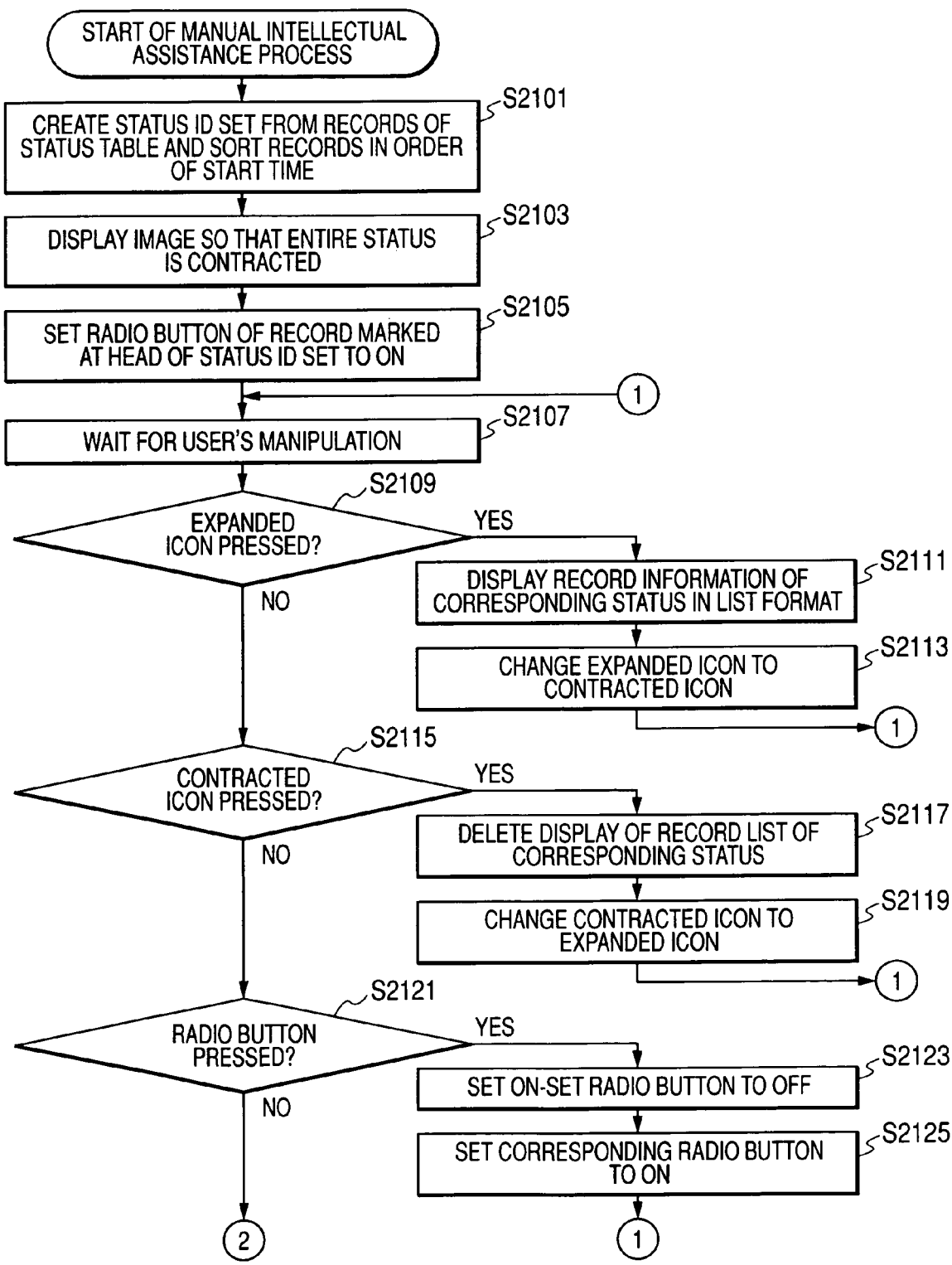
FIG. 21 is a diagram illustrating a flow of a manual intellectual assistance process according to an illustrative aspect of the invention.
Figure 22:
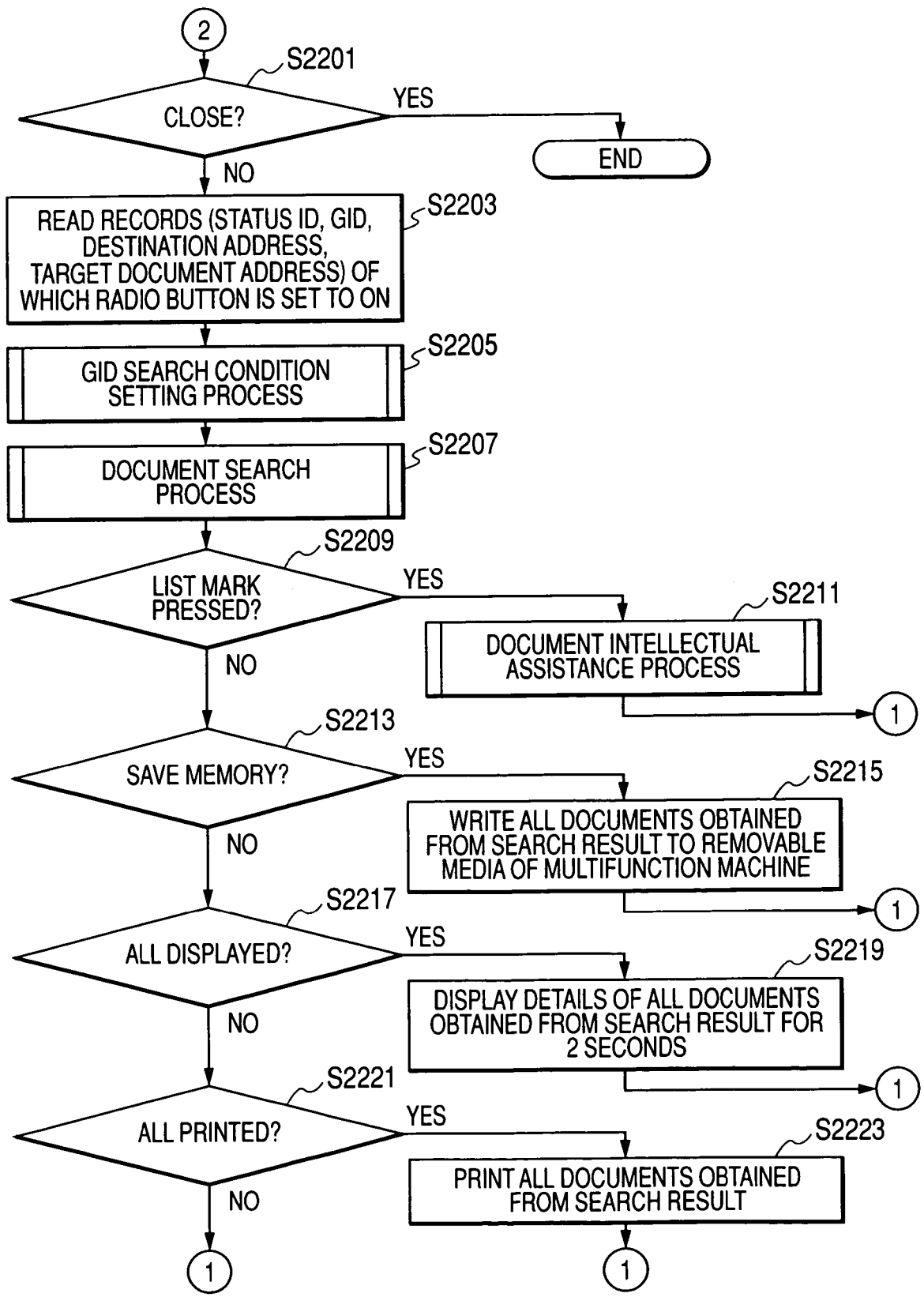
FIG. 22 is a diagram illustrating a flow of the manual intellectual assistance process according to an illustrative aspect of the invention.
Figure 25:
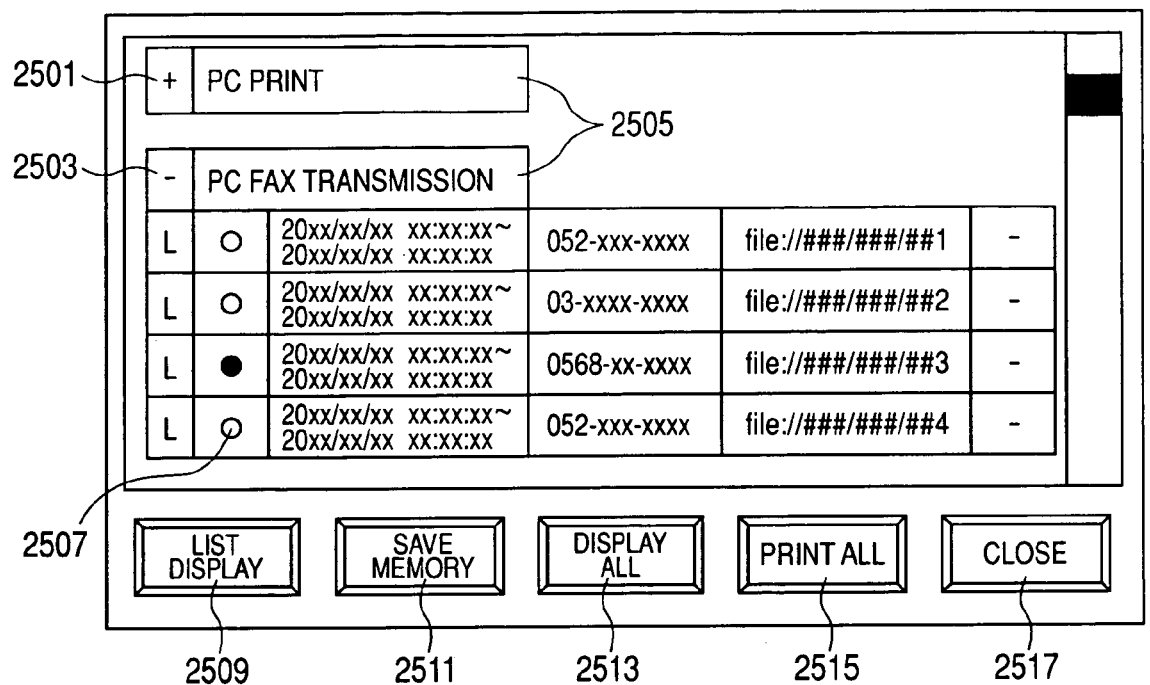
FIG. 25 is a diagram illustrating a display format (associated with the status table) of a search result in the manual intellectual assistance process according to an illustrative aspect of the invention.

FIGS. 21 and 22 are diagrams illustrating a flow of the manual intellectual assistance process. FIG. 25 is a diagram illustrating a display format of information displayed on the display section 106 of the PC with the performing of the manual intellectual assistance process.

In step 719, with the start of the manual intellectual assistance process, this process starts. This process operates in parallel to the PC main process shown in FIG. 7. That is, the process of step 719 proceeds to the process of step 701 without waiting for the end of the manual intellectual assistance process after the manual intellectual assistance process starts.

The control section 100 of the PC 10 creates a set of status IDs from the records of the status table 1081, performs a process of sorting the records of the set of status IDs in the order of start times (step 2101), and displays the result of the process on the display section 106 of the PC 10 (step 2103).

Here, in step 2103, the entire statuses 2305 are displayed in a contracted format, and specifically, only the titles of the processing operations indicated by the status IDs are displayed (see the display format of the PC print operation in FIG. 25).

In step 2105, in the display format displayed through the process of step 2103, a radio button 2507 (see FIG. 25) of the head record (the record sorted in the head in step 2101) of the status 2305 displayed at the uppermost position (PC print in FIG. 25) is set to ON with the initial setting (step 2105).

In the state in which the processes up to step 2105 are performed after the manual intellectual assistance process starts (step 719), the control section 100 waits until a user manipulates by the use of the operation section 104 (step 2107).

In the wait state (step 2107), when the user input an instruction by the use of the operation section 104, the control section 100 determines whether the instruction is to press an expanded icon 2501 (see FIG. 25) (step 2109).

Here, when the input instruction is to press the expanded icon 2501 (step 2109: YES), the record information of the status 2305 corresponding to the pressed expanded icon 2501 is displayed in a list format in response to the sorting process of step 2101 (step 2111) and the expanded icon 2501 of the expanded status 2805 is changed to a contracted icon 2503 (step 2113).

The processes of steps 2111 and 2113 are specifically described with reference to FIG. 25. In case of the PC fax transmission operation, the status 2305 is displayed along with the expanded icon 2501, similarly to the PC print operation, before the expanded icon 2501 is pressed (step 2109) (in other words, the list (records) is not displayed).

In this state, when the process of step 2109 is performed to the expanded icon 2501 for the PC fax transmission (step 2109: YES), the records of which the status IDs are marked "FPT" in the status table 1081 are displayed in the format shown in FIG. 25 in the sorting order of step 2101 (step 2111), and the expanded icon 2501 associated with the PC fax transmission is changed to the contracted icon 2503 (step 2113: the display is changed from "+" to "−"). At the time of first ending the process of step 2113, the process of step 2105 is valid, and all the radio buttons 2507 are set to OFF in the records displayed associated with the PC fax transmission.

On the other hand, in the wait state of step 2107, when the input instruction is not to press the expanded icon 2501 (step 2109: NO), but to press the contracted icon 2503 (step 2115: YES), the display in the PC fax transmission format shown in FIG. 25 is changed to the PC print format. That is, the display of the record list of the corresponding status 2305 is erased (step 2117) and the contracted icon 2503 is changed to the expanded icon 2501 (step 2119).

In the wait state of step 2107, when the input instruction is not to press the contracted icon 2503 (step 2115: NO), but to press the radio button 2507 (step 2121: YES), the radio button 2507 set to ON for a predetermined record (the head record of the uppermost status 2305 in the initial state) is changed to OFF (step 2123) and the radio button 2507 corresponding to the user's manipulation is set to ON (step 2125).

After the processes of step 2113, 2119, and 2125 are performed, the control section waits in step 2107 until the user's manipulation is performed.

Here, in the wait state of step 2107, when the instruction input by the user's manipulation is not to press any one of the expanded icon 2501, the contracted icon 2503, and the radio button 2507 (steps 2109, 2115, and 2121: NO), the process shown in FIG. 22 is performed.

That is, the control section 100 of the PC 10 determines whether the instruction input by the user's manipulation is the end of the manual intellectual assistance process, specifically, whether a closing button 2517 is pressed (step 2201). When it is YES (step 2201: YES), the process ends.

On the contrary, when the instruction is not to press the closing button 2517 (step 2201: NO), the instruction is to press a list display button 2509, a memory storage button 2511, an all display button 2513, or an all print button 2515. Accordingly, in order to perform the processes corresponding to the buttons, the records of which the radio button is set to ON (status ID, GID, destination address, target document) are read (step 2203).

The GID search condition setting process (step 2205) and the document search process (step 2207) are performed on the basis of the read information, and then the process of step 2209 is performed. Both processes performed in steps 2205 and 2207 are similar to the GID search condition setting process (step 1103) and the document search process (step 1105) performed in the during-activation intellectual assistance process (step 711), and thus description thereof is omitted.

In step 2209, it is determined whether the instruction, which is input through the user's manipulation of the operation section 104 and which results in the performing of the process of step 2203 is to press the list display button 2509. When the instruction is to press the list display button 2509 (step 2209: YES), the document intellectual assistance process is activated by the use of the result of the document search process of step 2207 (step 2211). The details of the document intellectual assistance process are described later with reference to FIGS. 23 and 24.

On the contrary, when the instruction is not to press the list display button 2509 (step 2209: NO), it is determined whether the instruction is to press the memory storage button 2511 (step 2213). When it is YES (step 2213: YES), the control section 100 instructs the multifunction machine 20 to write the document data of the document address described in the search result record obtained through the document search process (step 2207) to a removable media 2101, and transmits the corresponding document data from the storage section 108 to the multifunction machine 20 through the communication section 102. On the other hand, the control section 200 of the multifunction machine 20 writes the corresponding document data received through the communication section 214 in response to the instruction to the removable media 2101 (step 2215).

When the instruction is not to press the memory storage button 2511 (step 2213: NO), it is determined whether the instruction is to press the all display button 2513 (step 2217). When it is YES (step 2217: YES), the control section 100 opens the document data of the document address described in the search result record obtained through the document search process (step 2207), and sequentially displays the contents on the display section 106 with a predetermined interval of time, for example, 2 seconds (step 2219).

When the instruction is not to press the all display button 2513 (step 2217: NO), it is determined whether the instruction is to press the all print button 2515 (step 2217). When it is YES (step 2217: YES), the control section 100 transits the document data of the document address described in the search result record obtained through the document search process (step 2207) to the multifunction machine 20 through the communication section 102, and allows the recording section 202 of the multifunction machine 20 to print the document data (step 2223).

When the instruction is not to press the all print button 2515 (step 2221: NO), a process corresponding to the press is performed or it is determined that the press is erroneous. Then, the control section waits until the user's manipulation is performed (step 2107).

When the processes of steps 2211, 2215, 2219, and 2223 are finished, the control section waits in step 2107 until the user's input is performed.

Figure 23:
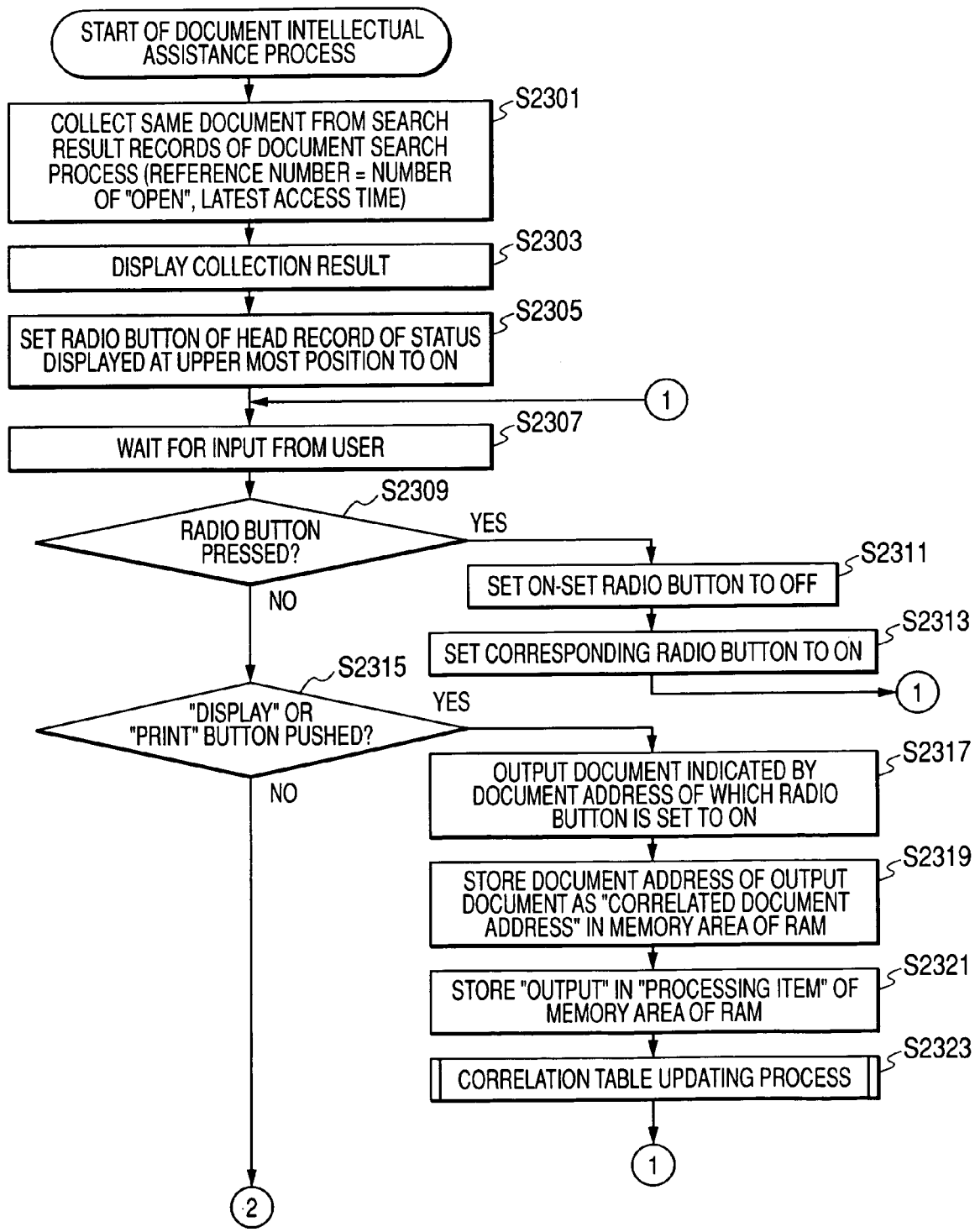
FIG. 23 is a diagram illustrating a flow of a document intellectual assistance process according to an illustrative aspect of the invention.
Figure 24:
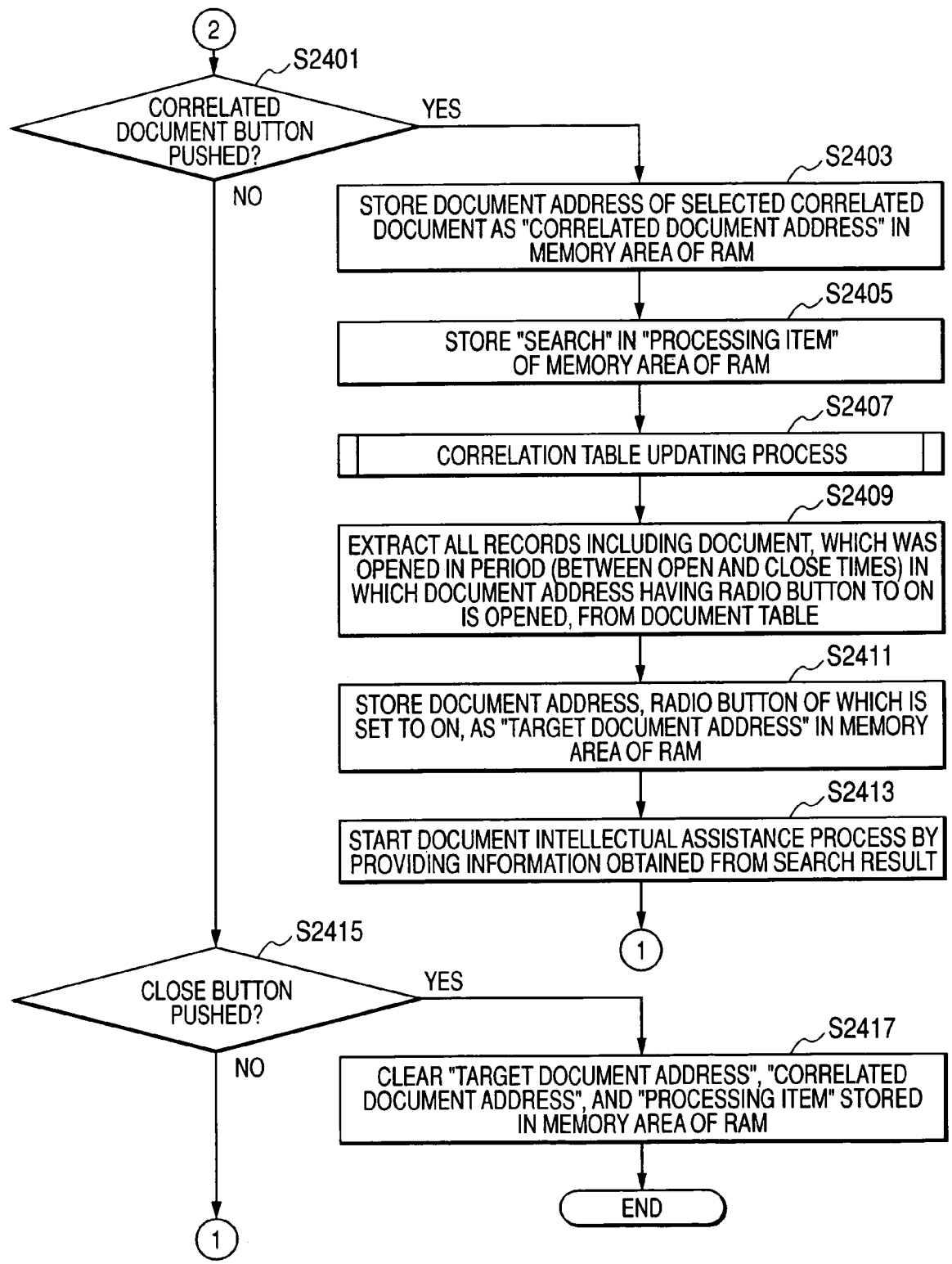
FIG. 24 is a diagram illustrating a flow of a document intellectual assistance process according to an illustrative aspect of the invention.
Figure 26:
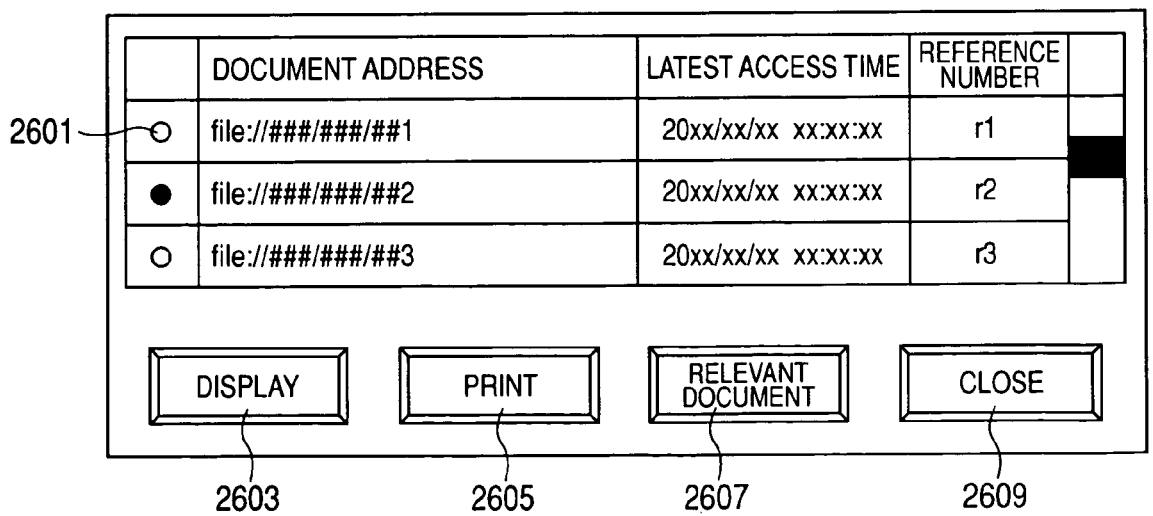
FIG. 26 is a diagram illustrating a display format (associated with the document table) of a search result in the manual intellectual assistance process according to an illustrative aspect of the invention.

FIGS. 23 and 24 are diagrams illustrating a flow of the document intellectual assistance process started in step 2211. FIG. 26 is a diagram illustrating a display format of information displayed on the display section 106 of the PC 10 at the time of performing the document intellectual assistance process.

First, in step 2301, the control section 100 of the PC 10 collects the number of reference to the document data (the number of records of which the event is "open") of the same document address and the final access time (time described in the latest record) from the search result records obtained through the document search process (step 2207) by the use of the records comprising the same document address (step 2301), and then performs the process of step 2303.

In step 2303, the collection result is displayed in the format shown in FIG. 26 on the display unit 106 (on the basis of only the collection process of step 2301). At this time, the radio button of the head record among the displayed records is set to ON (step 2305). In step 2303, the display process may be performed by performing the same processes as steps 1505 to 1513 of the search result display process (step 1107), that is, in the state where the correlation score given to the correlation with the target document address (step 1311: YES, which the same as the target document address stored as the target document address in step 1315) used as the search condition of the document search process (step 2207) and the records are sorted in accordance with the time or the reference number. According to this configuration, it is possible top referentially provide a user with a document having a high degree of correlation with the target document.

Here, in the state in which the processes up to step 2705 are performed after the document intellectual assistance process starts (step 2611), the control section 100 waits until the user manipulates the operation section 104 (step 2707).

In the wait state (step 2707), when the user input an instruction through the operation section 104, the control section 100 determines whether the input instruction is to press the radio button 2901 (see FIG. 29) (step 2709). When it is YES (step 2709: YES), the process of step 2701 is performed.

In step 2707, the radio button 2901 set to ON in a predetermined record (the head record in the initial state) is set to OFF (step 2711) and the radio button 2901 corresponding to the user's manipulation is set to ON (step 2713).

On the other hand, when it is determined in step 2709 that the input instruction is not to press the radio button 2901, it is determined whether the input instruction is to press the display button 2903 or the print button 2605 (step 2715). When it is YES (step 2715: YES), the process of step 2717 is performed.

In step 2317, when it is determined in step 2315 that the display button 2603 is pushed, the document data of the document address of which the radio button is set to ON is opened and displayed on the display unit 106. When it is determined that the print button 2605 is pushed, the control section 100 reads out the document data of the document address, of which the radio button is set to ON, from the storage unit 108 and transmits the corresponding document data to the multifunction machine 20 through the communication unit 102, the writer 202 prints the data, and then the process of step 2319 is performed. In step 2317, the display operation or the printing operation of the document data of the document address of which the radio button is set to ON is performed by an operating application (for example, viewer (see FIG. 4)) stored in the storage unit 108.

In step 2319, the document address of which the radio button is set to ON in step 2317 is stored as a correlated document address in a memory area of a predetermined area in the RAM of control section 100 (step 2319). Similarly, the processing item "output" (corresponding to "display" and "print") is stored in the memory area of a predetermined area in the RAM so as to have a correlation with the correlated document address (step 2321), and then the correlation table updating process (step 2323) is performed. The details of the correlation table updating process will be described later in detail with reference to FIG. 27.

When it is determined in step 2315 that the display button 2603 or the print button 2605 is not pushed, it is determined whether the correlated document button 2607 is pushed (step 2401) When this condition is satisfied (step 2401: YES), the process of step 2403 is performed.

In step 2403, the document address of which the radio button is set to ON in step 2317 is stored as a correlated document address in a memory area of a predetermined area in the RAM of control section 100. Similarly, the processing items "search" is stored in the memory area of a predetermined area in the RAM so as to have a correlation with the correlated document address (step 2405), and then the correlation table updating process (step 2407) is performed. The correlation table updating process is the same as the process performed in step 2323 and the details thereof will be described later in detail with reference to FIG. 27.

In step 2409, all the records having the event "open" in the period (between the open time and the close time) when the document data of the document address of which the radio button 2601 is set to ON is opened, in other words, all the records of the document addresses correlated with the document data repeatedly opened in the period when the document data of the document address of which the radio button 2601 is set to ON, are extracted from the document table 1081.

An example will be described specifically with reference to FIG. 26. Since the document data stored at the document address "file://###/###/###2" has the reference number of r2 and is opened r2 times, the extraction is performed to all the periods.

When determining the period in which the document data of the document address of which the radio button 2601 is set to ON is opened, the identity of the user (operator in FIG. 4) is considered.

The document address of which the radio button 2601 is set to ON is stored newly as a target document address in the memory area secured in a predetermined area of the RAM of the control section 100 (step 2411) and the process of step 2413 is performed.

In step 2413, the document intellectual assistance process is started again to the search result records obtained by the extraction in step 2409 (step 2413).

That is, the user can continuously see documents correlated with a certain document by performing the document intellectual assistance process.

When it is determined in step 2401 that the correlated document button 2607 is not pushed, the control section 100 determines whether the close button 2609 is pushed (step 2415). When this condition is satisfied (step 2415: YES), the "target document address", the "correlated document address", and the "processing item" stored in the memory area secured in the predetermined area of the RAM are cleared (step 2417). The controller ends document intellectual assistance process (step 2211) and waits again in step 2107 until a manipulation is input by the user.

On the other hand, when it is determined that the close button 2609 is not pushed (step 2415: NO), the controller performs a process corresponding to the pushing or determines that the pushing is erroneous, and waits again in step 2307 until a manipulation is input by the user.

When the processes of steps 2313, 2323, and 2413 are all finished, the controller waits again in step 2307 until a manipulation is input by the user.

Figure 27:
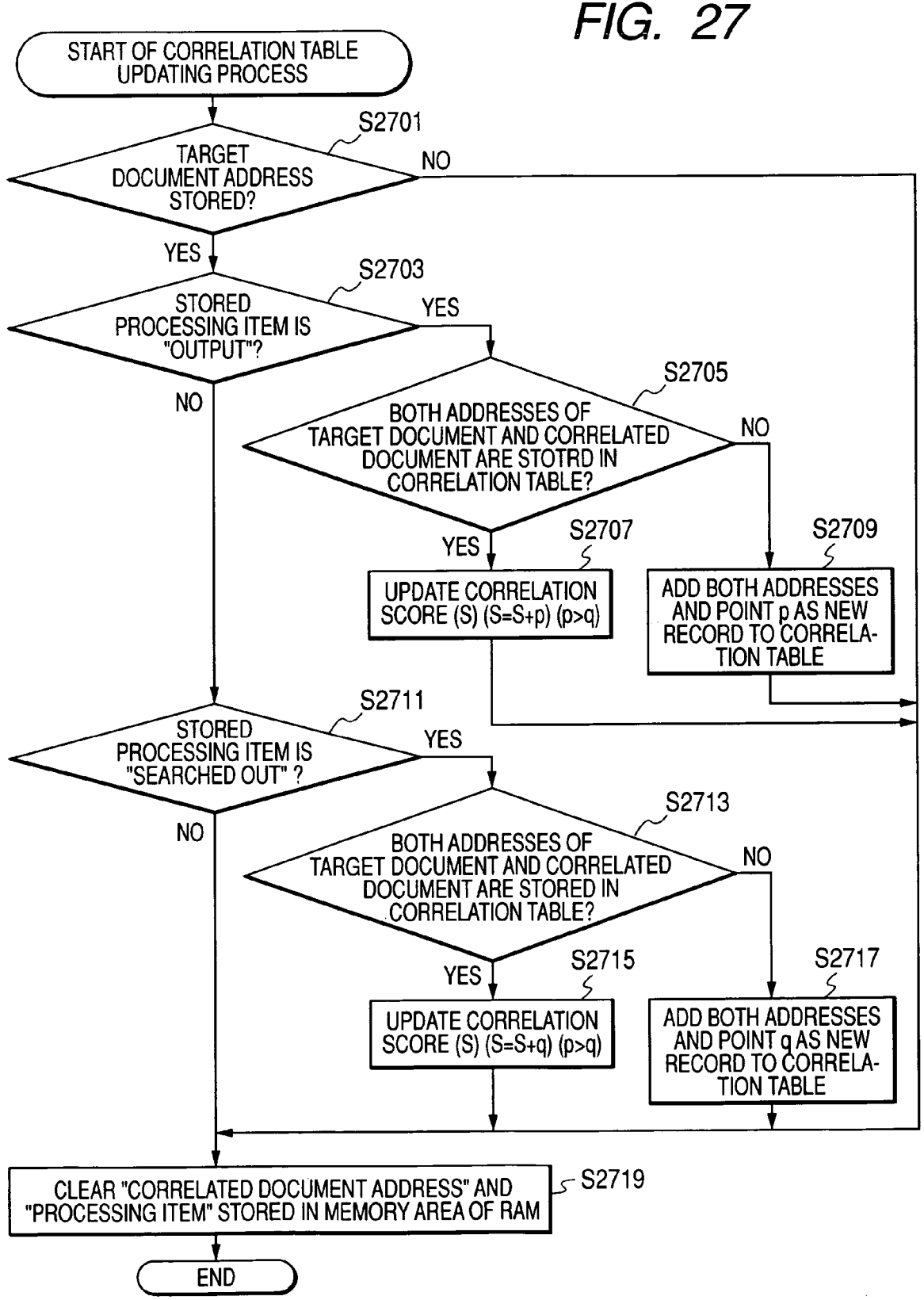
FIG. 27 is a diagram illustrating a flow of a correlation table updating process according to an illustrative aspect of the invention.

FIG. 27 is a diagram illustrating a flow of the correlation table updating process started in steps 2323 and 2407.

First, in the document search process (step 2207) performed during the manual intellectual assistance process (step 719), the controller of the PC 10 determines (step 2701)

whether the target document address is stored in the memory area secured in the predetermined area of the RAM (step 1315). When this condition is satisfied (step 2701: YES), the process of step 2703 is performed. When this condition is not satisfied (step 2701: NO), the process of step 2719 is performed.

It is determined in step 2703 whether "output" as the processing item correlated with the target document address is stored in the memory area secured in the predetermined area of the RAM. When this condition is satisfied (step 2703: YES), the process of step 2705 is performed. When this condition is not satisfied (step 2703: NO), the process of step 2711 is performed.

The "target document address", the "correlated document address", and the "processing item" stored in the memory area secured in the predetermined area of the RAM are sequentially stored in a series of processes (step 1315, step 2319, and step 2321, or step 2403 and step 2405) performed during the manual intellectual assistance process (step 719) and are correlated with each other.

In step 2705, the "target document address" and the "correlated document address" stored in the memory area secured in the predetermined area of the RAM are stored in the correlation table 1089, and it is determined whether the correlation score is given thereto (step 2703). When it is determined that the correlation score is given thereto (step 2705: YES), a predetermined point p (where the point p is greater than a point q given when the process item to be described later is set to "search" and, for example, the point p is set to 20 points when the point q is 10 points) given when the processing item is "output" is added to the correlation score of the record correlated with the corresponding "target document address" and the corresponding "correlated document address" (step 2707) and then the process of step 2719 is performed.

On the other hand, when it is determined that the correlation score is not given thereto (step 2705: NO), the control section 100 of the PC 10 registers the target document address in document address 1 and the correlated document address in document address 2 as new records of the correlation table 1089, gives the point p as the correlation score (step 2709), and then performs the process of step 2719.

It is determined in step 2711 whether "search" is stored as the processing item correlated with the target document address in the memory area secured in the predetermined area of the RAM. When this condition is satisfied (step 2711: YES), the process of step 2713 is performed. When this condition is not satisfied (step 2713: NO), the process of step 2719 is performed.

In step 2713, the "target document address" and the "correlated document address" stored in the memory area secured in the predetermined area of the RAM are stored in the correlation table 1089, and it is determined whether the correlation score is given thereto (step 2713). When it is determined that the correlation score is given thereto (step 2715: YES), a predetermined point q given when the processing item is "search" is added to the correlation score of the record correlated with the corresponding "target document address" and the corresponding "correlated document address" (step 2715) and then the process of step 2719 is performed.

On the other hand, when it is determined that the correlation score is not given thereto (step 2713: NO), the control section 100 of the PC 10 registers the target document address in document address 1 and the correlated document address in document address 2 as new records of the correlation table 1089, gives the point q as the correlation score (step 2717), and then performs the process of step 2719.

In step 2709 and step 2717, even when the relation between the "target document address", the "correlated document address", "document address 1", and "document address 2" is contrary to the above-mentioned relation, no problem is caused in the configuration of the information management system 1 according to the first illustrative aspect.

In step 2719, the correlation table updating process is ended by clearing the "correlated document address" and the "processing item" stored in the memory area secured in the predetermined area of the RAM. The "target document address" is not cleared, but is stored in the memory area secured in the predetermined area of the RAM in step 2719. This is because the document intellectual assistance process (step 2211) can be performed again in response to the input from the user (step 2307) after the correlation table updating process (step 2323 and step 2407) is ended.

As described above, the correlation score is given when "output" and "search" are stored as the processing item, that is, when it is detected in step 2315 of the document intellectual assistance process (see FIGS. 23 and 24) that the button "display" or the button "print" is pushed, and when it is detected in step 2401 that the button "correlated document" is pushed (steps 2707 and 2709 or steps 2715 and 2717).

That is, in the former, the user outputs (displays or prints) the document data (document data correlated with "file://####/####/####2") of which the radio button 2601 is pushed in FIG. 26) while being aware of the target document data (document data correlated with "file://####/####/####3") of which the radio button 2507 is pushed in FIG. 25). In other words, the user confirms the details of the document data correlated with the target document data while being aware of the target document data. Accordingly, both document data are considered as having a high degree of correlation with each other (correlation in comparison with the document data of which the radio button 2601 is not pushed in FIG. 26).

In the latter, on the basis of the document data (similar to that of the "former") considered as being correlated with the target document data (similar to that of the "former"), the user's behavior (behavior searching out another document data correlated with the document data in order to understand the document data correlated with the target document or in order to understand the intention for the creation of the document data) can be considered as a behavior performed to understand the document data correlated with the target document data.

(Process 2 of Information Management System)

Next, a process (2) of the information management system 1 comprising the above-mentioned configuration is described with reference to the drawings. The process (2) starts in parallel to the process (1).

Figure 28:
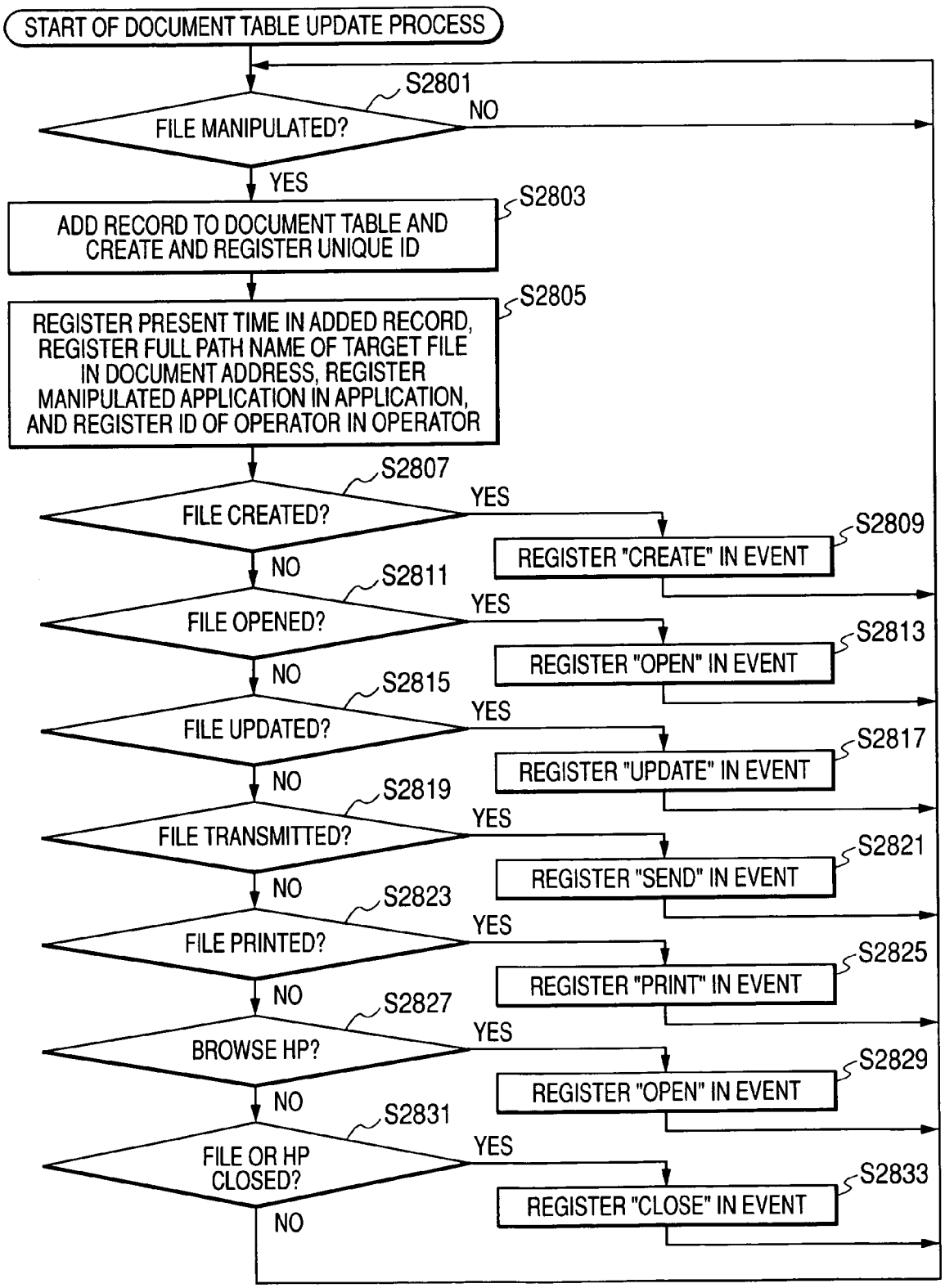
FIG. 28 is a diagram illustrating a flow of a document table updating process according to an illustrative aspect of the invention.

FIG. 28 is a diagram illustrating a flow of a process of updating the document table 1083 performed by the PC 10. The process (2) shown in the flow is performed by the control section 100 of the PC 10, and more specifically, is performed by the CPU of the control section 10 by the use of the program stored in the ROM or the like.

First, when the document data stored in the storage section 108 are manipulated by the use of the operation section 104 or the operation of the multifunction 20 is carried out, that is, when the target document data are transmitted to the PC 10 from the multifunction machine 20 by starting the processing operation (status) described as "(copied to PC)" among the items of the "target document address" of FIG. 3, the target document data are newly stored in the storage section 108, the RFID tags 322 and 324 of the books 32 and 34 are read by the RFID tag reading section 306 of the book sensor 30, and the information is transmitted to the PC 10 through the communication section 34, the control section 100 determines whether a homepage (hereinafter, referred to as "HP") on Internet 70, which introduces the book 32 or the like associated with the transmission from the book sensor 30, is opened (hereinafter, the manipulations or processes are referred to as "file manipulation") (step 2801).

When it is determined in step 2801 that the file manipulation is performed (step 2801: YES), the control section 100 adds a record to the document table 1083, creates an ID unique to the record, registers the unique ID (step 2803), and then performs the process of step 2805.

When it is determined in step 2801 that the condition is not satisfied (step 2801: NO), the control section waits until the file manipulation is performed.

In step 2805, the present time is registered to the record added in step 2803, registers an application obtained by preparing a full pass name of the target file with a application to the document address, and registers the type of the operator to the operator.

Thereafter, a process of determining information to be registered to the "event" not yet registered is performed (steps 2807 to 2833).

First, the control section 100 determines whether the file manipulation performed in step 2801 is to store a new document file in the storage section 108 (hereinafter, referred to as "file creation" (step 2807). The control section registers "create" as an event, when the file manipulation is the file creation (step 2807: YES).

On the other hand, when the file manipulation is not the file creation (step 2807: NO), the control section determines whether the file manipulation is to open the document file stored in the storage section 108 (hereinafter, referred to as "file opening") (step 2811). When it is YES (step 2811: YES), the control section registers "open" as an event (step 2813).

When it is not YES in step 2811 (step 2811: NO), it is determined whether the document data stored in the storage section 108 is updated (overwritten) (step 2815). When it is YES (step 2815: YES), "update" is registered as an event (step 2813).

When it is not YES in step 2815 (step 2815: NO), it is determined whether the document data stored in the storage section 108 is transmitted (the PC fax transmission is comprised) (step 2819). When it is YES (step 2819: YES), "send" is registered as an event (step 2821).

When it is not YES in step 2819 (step 2819: NO), it is determined whether the document data stored in the storage section 108 is printed (which corresponds to the status "PC fax transmission" in FIG. 3) (step 2819). When it is YES (step 2821: YES), "send" is registered as an event (step 2821).

When it is not YES in step 2815 (step 2815: NO), it is determined whether the document data stored in the storage section 108 is printed (the recording section 202 of the multifunction machine 20 is used) (step 2823). When it is YES (step 2823: YES), "print" is registered as an event (step 2825).

When it is not YES in step 2823 (step 2823: NO), it is determined whether the HP is opened (step 2827). When it is YES (step 2827: YES), "open" is registered as an event (step 2829).

When it is not YES in step 2827 (step 2827: NO), it is determined whether the file or HP is closed, which corresponds to the file opening (step 2811) or the HP opening (step 2827) (step 2831). When it is YES (step 2831: YES), "close" is registered as an event (step 2829).

When it is not YES in step 2831 (step 2831: NO), the control section 100 waits until a file manipulation is performed again, after finishing the process of step 2809, 2813, 2817, 2821, 2825, 2829, or 2833.

Hitherto, the "document data" have been mainly exemplified in the description according to the first illustrative aspect. however, the data as a target of the information management system 1 are not limited to the "document data", but the same details (processes) may be performed to, for example, "image data", "sound data", other data, or mixtures of the data.

SECOND EXAMPLE

Hereinafter, an information management system different from the first illustrative aspect will be described.

A second illustrative aspect of the invention is different from the first illustrative aspect, in that the "GID" used in the first illustrative aspect is not provided, that is, the "GID" is not defined in FIG. 3 and the "GID search condition setting process" is not performed in the during-activation intellectual assistance process and the manual intellectual assistance process. Therefore, the details of the same configuration and process order are omitted but only differences are described in the following description (since the process order in the manual intellectual assistance process is similar to the during-activation intellectual assistance process, the during-activation intellectual assistance process is substantially described in the second illustrative aspect).

(During-Activation Intellectual Assistance Process)

Figure 29:
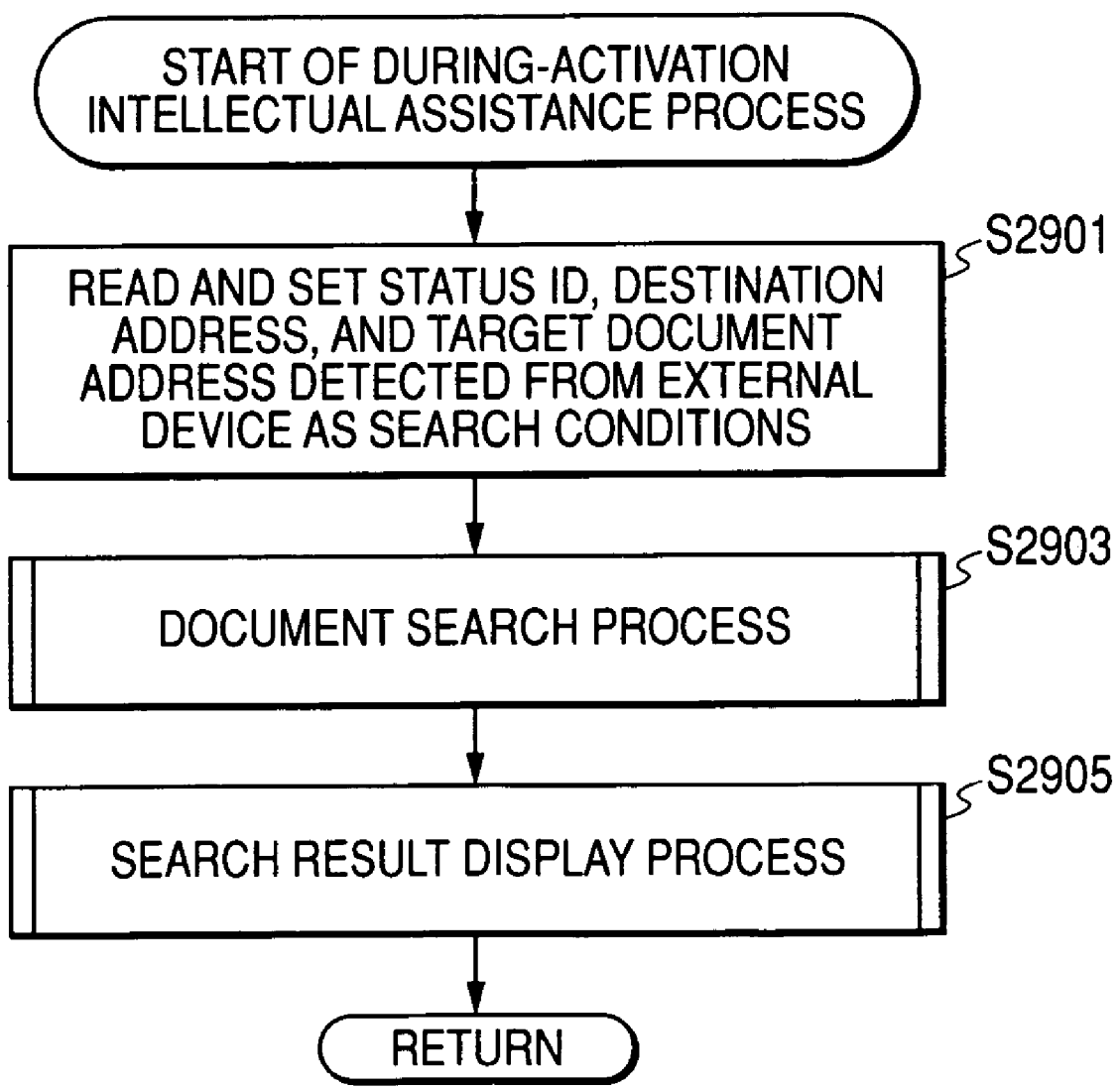
FIG. 29 is a diagram illustrating a flow of the during-activation intellectual assistance process according to a second illustrative aspect of the invention.

FIG. 29 is a diagram illustrating a flow of the during-activation intellectual assistance process.

When the during-activation intellectual assistance process is performed in step 711 of FIG. 7, the control section 100 of the PC 10 first reads the status ID, the destination address, and the target document address input (detected) by the external device from the RAM in step 709. The control section sets the data selected by the user through the operation section 104 as a search condition (step 2901), and performs the document search process (step 2903).

FIG. 13 is a diagram illustrating a flow of the document search process (step 2903). First, all the records in the status table 1081 and the document table 1083 are set to the initial values of the search result records (step 1301).

Next, in order to specify the target document associated with a specific record from the status table 1081, a search process is performed on the basis of the search condition selected in step 2903.

That is, in step 1303, it is determined whether the status ID is set as the search condition (step 1303). When it is YES (step 1303: YES), the record corresponding to the status ID set as the search condition in the status table 1081 is stored as the search result record (step 1305) and the process of step 1307 is performed. When the status ID is not set as the search condition (step 1303: NO), the process of step 1307 is performed without performing the process of step 1305.

In step 1307, it is determined whether the destination address is added as the search condition. When it is YES (step 1307: YES), the record corresponding to the destination address designated as the search condition among the search result records stored in step 1305 is stored as the search result record (step 1309) and then the process of step 1311 is performed. In step 1307, when the destination address is not added as the search condition (step 1307: NO), the process of step 1311 is performed without performing the process of step 1309.

In step 1311, it is determined whether the target document address is added as the search condition. When it is determined that the target document address is set (step 1311: YES), the record corresponding to the target document address designated as the search condition among the search result records stored in step 1305 and the like is stored as the search result record (step 1313) and then the process of step 1315 is performed.

In step 1315, the target document address set as the search condition is stored as a target document address in a memory area in a predetermined area of the RAM of the control section 100 (step 1315), and then the process of step 1317 is performed.

In step 1317, records having the same addresses as the target document address set as the search condition and stored as a target document address in step 1315 are specified from the correlation table 1089. An address to which a correlation score is given is extracted from the same addresses as the target document address, a record having the same address as the extracted address is specified from the document table 1083, the specified record is stored as the search result record along with the correlation score stored in the correlation table 1089, and then the process of step 1319 is performed.

When it is determined in step 1311 that the target document address is not added as the search condition (step 1311: NO), the process of step 1315 is performed without performing the process of step 1313.

Here, the search result records obtained through the processes of steps 1303 to 1313 will be described in more detail.

When it is YES in steps 1303, 1307, and 1311, the search result records comprise the records in the same status table 1081 as being stored in step 1313.

When it is YES in steps 1303 and 1307 and it is NO in step 1311, the search result records comprise the records in the same status table 1081 as being stored in step 1309.

When it is YES in steps 1303 and 1311 and it is NO in step 1307, the search result records comprise the records in the same status table 1081 as being stored in step 1313.

When it is YES in step 1303 and it is NO in steps 1307 and 1311, the search result records comprise the records in the same status table 1081 as being stored in step 1305.

When it is NO in step 1303 and it is YES in steps 1307 and 1311, the search result records comprise the records in the same status table 1081 as being stored in step 1313.

When it is NO in steps 1303 and 1311 and it is YES in step 1307, the search result records comprise the records in the same status table 1081 as being stored in step 1309.

When it is NO in steps 1303 and 1307 and it is YES in step 1311, the search result records comprise the records in the same status table 1081 as being stored in step 1313.

When it is NO in steps 1303, 1307 and 1311, the search result records comprise the records in the same status table 1081 as the status table 1081 set as an initial value in step 1301.

In step 1319, in order to perform the processes subsequent to step 1321, a non-processed search result record is read from the search result records specified in steps 1303 to 1313 and then the process of step 1321 is performed.

The processes after step 1321 including the search result display process are similar to those of the first illustrative aspect, and thus details thereof are not described.

What is claimed is:

1. An information management device comprising:
   a data storage unit that stores a plurality of data;
   a utilization unit that utilizes the data;
   a period specifying unit that specifies a period in which the data are utilized by the utilization unit;
   a correlation giving unit that correlates one data and another data with each other when one period specified by the period specifying unit for the one data stored in the data storage unit and another period specified by the period specifying unit for the another data stored in the data storage unit overlap each other;
   a search unit that searches out the another data correlated with the one data by the correlation giving unit by using one identification information piece to identify the one data as a first search condition;
   an output unit that outputs another identification information piece to identify the another data extracted by the search unit as being correlated with the one data;
   a detection unit to detect that the another data is utilized by the utilization unit or that the another data is replaced with the one data and then another data is searched out by the search unit, on the basis of the another identification information output by the output unit;
   a score giving unit that gives a score to the correlation of the another data output by the output unit with the one data correlated with the another data on condition that it is detected by the detection unit that another data is utilized by the utilization unit or is searched out by the search unit;
   an accumulation unit that accumulates the score given by the score giving unit;
   a score storage unit that stores the score accumulated by the accumulation unit; and
   an output control unit that controls to output the another data, to the correlation of which with the one data the score is given, in the order of the score stored in the score storage unit,
   wherein the period specifying unit is configured to:
   specify the one period in which the one data is utilized based on a utilization start time of the one data and a utilization end time of the one data;
   specify the another period in which the another data is utilized based on a utilization start time of the another data and a utilization end time of the another data, and
   wherein the utilization start time and the utilization end time indicate at least one of year, date and time of day.

2. An information management system comprising:
   an information management device comprising:
   a data storage unit that stores a plurality of data;
   a utilization unit that utilizes the data;
   a period specifying unit that specifies a period in which the data are utilized by the utilization unit;
   a correlation giving unit that correlates one data and another data with each other when one period specified by the period specifying unit for the one data stored in the data storage unit and another period specified by the period specifying unit for the another data stored in the data storage unit overlap each other;
   a search unit that searches out the another data correlated with the one data by the correlation giving unit by using one identification information piece to identify the one data as a first search condition;
   an output unit that outputs another identification information piece to identify the another data extracted by the search unit as being correlated with the one data;
   a detection unit to detect that the another data is utilized by the utilization unit or that the another data is replaced with the one data and then another data is searched out by the search unit, on the basis of the another identification information output by the output unit;
   a score giving unit that gives a score to the correlation of the another data output by the output unit with the one data correlated with the another data on condition that it is detected by the detection unit that another data is utilized by the utilization unit or is searched out by the search unit;

an accumulation unit that accumulates the score given by the score giving unit;

a score storage unit that stores the score accumulated by the accumulation unit;

an output control unit that controls to output the another data, to the correlation of which with the one data the score is given, in the order of the score stored in the score storage unit; and an external device that is connected to the information management device in a communication-practicable manner and has at least one function performing unit that performs a predetermined process, wherein the external device comprises a transmission unit that transmits process specifying information, which is used to specify a process performed by the function performing unit and a period in which the process is performed, and data, which is obtained by performing the process, to the information management device, wherein the information management device further comprises:

a reception unit that receives the process specifying information and the data transmitted from the external device; and a storage control unit that correlates and stores the process specifying information and the data received by the reception unit in the data storage unit, wherein the period specifying unit specifies the period which is included in the process specifying information and in which the process is performed, wherein the correlation giving unit correlates the one data with the another data by using the period correlated with the process specifying information specified by the period specifying unit as the one period and using the data correlated with the process specifying information as the one data, and wherein the search unit can search the data storage unit for the data having been subjected to the same process by using the process, which is performed by the function performing unit and included in the process specifying information, as a second search condition and can search out the another data by using the data searched out on the basis of the second search condition, wherein the period specifying unit is configured to:

specify the one period in which the one data is utilized based on a utilization start time of the one data and a utilization end time of the one data;

specify the another period in which the another data is utilized based on a utilization start time of the another data and a utilization end time of the another data, and wherein the utilization start time and the utilization end time indicate at least one of year, date and time of day.

3. A computer usable medium having computer readable instructions stored thereon for enabling a computer to perform predetermined operations including the steps of:

storing a plurality of data in a storage unit;

utilizing the data;

specifying a period in which the data are utilized;

correlating one data and another data with each other when one period specified by the specifying for the one data stored in the data storage unit and another period specified by the specifying for the another data stored in the data storage unit overlap each other;

searching out the another data correlated with the one data by using one identification information piece to identify the one data as a first search condition;

outputting another identification information piece to identify the another data extracted by the searching as being correlated with the one data;

detecting that the another data is utilized or that the another data is replaced with the one data and then another data is searched out by the searching, on the basis of the another identification information output by the outputting;

giving a score to the correlation of the another data output by the outputting with the one data correlated with the another data on condition that it is detected that another data is utilized or is searched out;

accumulating the score thus given;

storing the score thus accumulated; and controlling to output the another data, to the correlation of which with the one data the score is given, in the order of the score stored in the score storage unit, wherein the period specifying unit is configured to:

specify the one period in which the one data is utilized based on a utilization start time of the one data and a utilization end time of the one data;

specify the another period in which the another data is utilized based on a utilization start time of the another data and a utilization end time of the another data, and wherein the utilization start time and the utilization end time indicate at least one of year, date and time of day.

4. The information management device according to claim 1, further comprising a second storage unit configured to store identification information of the data utilized by the utilization unit in association with the period specified by the period specifying unit.

* * * * *